(12) United States Patent
Alexander et al.

(10) Patent No.: US 12,079,224 B2
(45) Date of Patent: Sep. 3, 2024

(54) DATABASE SYSTEMS WITH ADAPTIVE AUTOMATED METADATA ASSIGNMENT

(71) Applicant: Salesforce, Inc., San Francisco, CA (US)

(72) Inventors: Zachary Alexander, Berkeley, CA (US); Yixin Mao, San Francisco, CA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/064,696

(22) Filed: Dec. 12, 2022

(65) Prior Publication Data

US 2024/0193167 A1   Jun. 13, 2024

(51) Int. Cl.
| | | |
|---|---|---|
| G06F 7/00 | (2006.01) | |
| G06F 16/00 | (2019.01) | |
| G06F 16/242 | (2019.01) | |
| G06F 16/2457 | (2019.01) | |
| G06F 16/28 | (2019.01) | |

(52) U.S. Cl.
CPC ...... G06F 16/24573 (2019.01); G06F 16/244 (2019.01); G06F 16/285 (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Scikit-Learn Developers (BSD License), 2.1. Gaussian mixture models, https://scikit-learn.org/stable/modules/mixture.html, 2007.

(Continued)

*Primary Examiner* — Tuan A Pham
(74) *Attorney, Agent, or Firm* — Lorenz & Kopf, LLP

(57) ABSTRACT

Database systems and methods are provided for assigning structural metadata to records and creating automations using the structural metadata. One method of assigning structural metadata involves determining a candidate group of semantically similar conversations based on unassigned conversations, determining a clustering performance metric associated with the candidate group based on a relationship between the candidate group and a plurality of existing groups of semantically similar conversations, and when the clustering performance metric is greater than a threshold, automatically assigning one or more unassigned conversations to the candidate group based on the representative utterances associated therewith and automatically updating one or more associated records at a database system to include metadata identifying the candidate group.

17 Claims, 17 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0174600 A1* | 6/2018 | Chaudhuri ........ H04N 21/44008 |
| 2021/0256534 A1* | 8/2021 | An ..................... G06N 3/08 |
| 2022/0200936 A1* | 6/2022 | Higgins ................ G06F 40/30 |

OTHER PUBLICATIONS

Cambridge University Press, Dropping common terms: stop words, https://nlp.stanford.edu/IR-book/html/htmledition/dropping-common-terms-stop-words-1.html.

Wikipedia, Hierarchical clustering, https://en.wikipedia.org/wiki/Hierarchical_clustering.

Wikipedia, k-nearest neighbors algorithm, https://en.wikipedia.org/wiki/K-nearest_neighbors_algorithm.

(56) References Cited

OTHER PUBLICATIONS

Wikipedia, Lemmatisation, https://en.wikipedia.org/wiki/Lemmatisation.
sklearn.metrics.silhouette_score, https://scikit-learn.org/stable/modules/generated/sklearn.metrics.silhouette_score.html.
Wikipedia, Text normalization, https://en.wikipedia.org/wiki/Text_normalization.
Wikipedia, tf-idf, https://en.wikipedia.org/wiki/Tf%E2%80%93idf.

* cited by examiner

FIG. 12

DATABASE SYSTEMS WITH ADAPTIVE AUTOMATED METADATA ASSIGNMENT

TECHNICAL FIELD

One or more implementations relate to the field of database systems, and more specifically, to automatically assigning metadata to unstructured conversations to support analytics, recommendations and other automations.

BACKGROUND

Modern software development has evolved towards web applications and cloud-based applications that provide access to data and services via the Internet or other networks. Businesses also increasingly interface with customers using different electronic communications channels, including online chats, text messaging, email or other forms of remote support. Artificial intelligence (AI) may also be used to provide information to users via online communications with "chat-bots" or other automated interactive tools. Using chat-bots, automated AI systems conduct text-based chat conversations with users, through which users request and receive information. Chat-bots generally provide information to users for predetermined situations and applications. However, functionality of the chat-bot may be limited, and the chat-bot may not have access to all applicable information. Therefore, in some scenarios, an end user may be transferred from the chat-bot to a live agent or customer service representative.

The use of electronic communications results in a large amount of conversational data, including online chat messages, call transcripts, emails, text messages, and the like capable of providing insights or supporting other business intelligence. However, conversations often can be free-form and unstructured, which limits the ability to provide insights or other visibility regarding the substance or semantics of the conversations that could otherwise drive key performance indicators (KPIs), recommendations, automations or other actions that could improve user experience, productivity, and/or the like. Accordingly, it is desirable to provide systems and methods that facilitate business intelligence using unstructured conversations.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIGS. 10-13 depict exemplary graphical user interface (GUI) displays suitable for presentation by a computing system in connection with one or more of the conversation mapping process of FIG. 5 and the automation assistance process of FIG. 9 according to some exemplary implementations;

DETAILED DESCRIPTION

Figure 1:
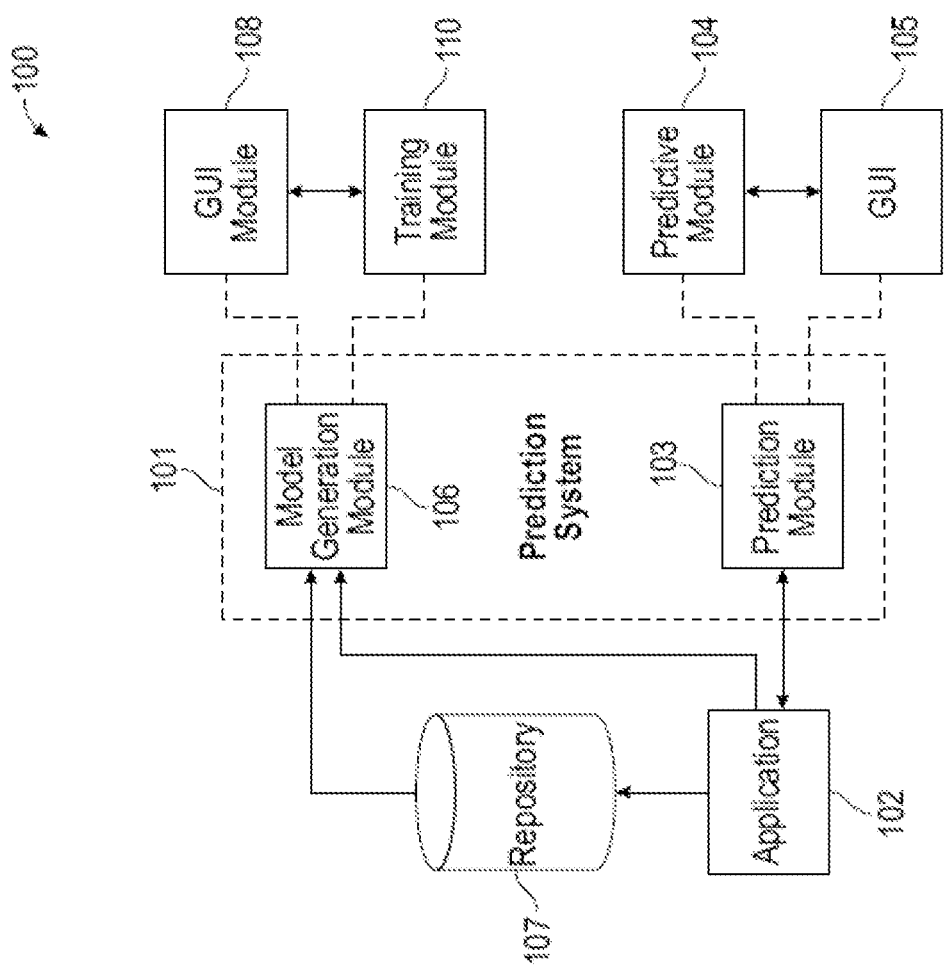
FIG. 1 is a block diagram depicting an exemplary computing environment that can be used to implement aspects of the current subject matter, in accordance with one or more implementations.

The subject matter described herein generally relates to computing systems and methods for automatically mapping conversations to different high-level semantic groups for determining performance metrics or other key performance indicators (KPIs) for a particular semantic group. Additionally, within each semantic group, the constituent conversations are automatically grouped into different clusters of similar conversations (e.g., based on similar semantics, syntax, intents, nouns, verbs, and/or the like), which likewise support determining performance metrics or other KPIs on a per-cluster basis. Individual conversations are associated with a representative utterance automatically identified from within the respective conversation as the most semantically significant utterance of the conversation or the utterance most likely to convey the intent of the conversation. In this regard, the representative utterances associated with the different conversations are utilized to automatically cluster semantically similar conversations into different cluster groups based on the semantic similarity of the representative utterances associated with the respective conversations assigned to a respective cluster group of semantically similar conversations. The cluster groups are then clustered or otherwise assigned to different higher-level semantic groups based on the semantic similarity of the representative clusters assigned to the respective semantic group. For example, in a customer relationship management (CRM) scenario with different conversations between customers and customer support representatives of an organization (e.g., live agents, chat bots, or the like), different representative utterances having semantic similarity may be clustered and assigned to a common contact reason group (e.g., conversations where customers initiated contact with customer support for a particular reason in common), with different semantically-similar contact reason groups being assigned to a common topic group.

By virtue of the conversation mapping described herein, a discrete conversation, which itself may include or otherwise contain any number of different utterances by different conversation participants or actors, is automatically assigned a representative utterance from within that conversation, a cluster group of semantically similar conversations assigned based on its associated representative utterance, and a higher-level semantic group that includes its assigned cluster group, thereby providing structural metadata associated with the respective conversation that allows for performance metrics to be determined across different groups of conversations using the structural metadata. In this regard, the representative utterance, assigned cluster group, and assigned semantic group are stored or otherwise maintained as fields of metadata associated with a conversation, thereby providing structure for the conversation that supports tracking and monitoring KPIs across different semantic groups and cluster groups and corresponding recommendations or automations. In this regard, the subject matter described herein derives business intelligence from unstructured conversational data associated with historical conversations or interactions maintained by a computing platform to facilitate creation of recommendations or automations with respect to subsequent conversations or interactions on the platform. For example, the structural metadata may be utilized to calculate or otherwise determine KPIs or other performance metrics associated with a particular semantic group (e.g., based on the conversations assigned to a common topic), while another set of KPIs or performance metrics may be calculated for each cluster group assigned to that semantic group (e.g., based on the subset of conversations assigned to a particular common contact reason underneath a common topic), and yet additional KPIs or performance metrics may be calculated for each representative utterance assigned to that cluster group (e.g., based on the conversation(s) associated with a particular representative utterance).

In exemplary implementations, the conversations being analyzed are unstructured and free form using natural language that is not constrained to any particular syntax or ordering of speakers or utterances thereby. In this regard, an utterance should be understood as a discrete uninterrupted chain of language provided by an individual conversation participant or actor or otherwise associated with a particular source of the content of the utterance, which could be a human user or speaker (e.g., a customer, a sales representative, a customer support representative, a live agent, and/or the like) or an automated actor or speaker (e.g., a "chat-bot" or other automated system). For example, in a chat messaging or text messaging context, each separate and discrete message that originates from a particular actor that is part of the conversation constitutes an utterance associated with the conversation, where each utterance may precede and/or be followed by a subsequent utterance by the same actor or a different actor within the conversation.

It should be noted that although the subject matter may be described herein in the context of conversations (e.g., call transcripts, chat logs, text message logs, comment threads, feeds and/or the like) for purposes of explanation, the subject matter described herein is not necessarily limited to conversations and may be implemented in an equivalent manner with respect to any particular type of database record or database object including text fields which may be analyzed to determine a semantic representation of a respective database record or object for subsequent clustering or grouping based on semantic similarity across different database records of the same database object type. For example, the text values for the subject, description and comments fields of a database record for a case database object type may be analyzed to determine a semantic representation of the case database record across those fields, which, in turn, may be utilized to group different semantically similar database records without requiring the values for those fields of the different case database records to exactly match one another across the different case database records.

As described herein, in some implementations, a semantic group summary graphical user interface (GUI) display is provided that includes graphical indicia of the different semantic groups that were identified from analysis of past conversations (e.g., transcripts, logs, feeds, threads and/or the like), thereby providing a high-level summary of the semantic content of the underlying conversational data that spans numerous different conversations between numerous different speakers. The semantic group summary GUI display may also include indicia of one or more performance metrics or KPIs associated with the respective semantic group, such as, for example, a number or percentage of conversations assigned to that respective semantic group, the frequency or rate of occurrence of conversations assigned to that respective semantic group, the number, the average duration or length of conversations assigned to that respective semantic group, percentage or frequency of a particular type of outcome or resolution for conversations assigned to that respective semantic group, and/or the like. For example, a graphical representation of a semantic group having a greater number of conversations and/or cluster groups associated therewith may be rendered with a larger size or other visually distinguishable characteristic that emphasizes the relative significance of that semantic group relative to the graphical representation of another semantic group having a lesser number of conversations and/or cluster groups associated therewith.

The graphical indicia of the different semantic groups may be selectable or otherwise realized as GUI elements (e.g., hyperlinks, expandable panels and/or the like) that allow a user to drill down to review cluster groups associated with the respective semantic group. For example, selection of a particular semantic group may result in a semantic group analysis graphical user interface (GUI) display that includes graphical indicia of the different cluster groups that were assigned to that particular semantic group and corresponding indicia of one or more performance metrics or KPIs associated with the respective cluster groups. Likewise, the graphical indicia of the different cluster groups may be selectable or otherwise realized as GUI elements that allow a user to drill down to review conversations associated with the respective cluster group. For example, selection of a particular cluster group may result in a cluster group analysis GUI display that includes graphical indicia of the representative utterances associated with the different conversations that were assigned to that particular cluster group and corresponding indicia of one or more performance metrics or KPIs associated with the respective representative utterances and/or conversations.

In one or more implementations, the cluster group analysis GUI display includes one or more selectable GUI elements that are selectable by a user to create or otherwise define one or more automated actions to be associated with a particular representative utterance. For example, based on the frequency of recurrence of a particular representative utterance, the duration of time associated with conversations involving a particular representative utterance, and/or other performance metrics or KPIs associated with a particular representative utterance, the user may select a GUI element to create a recommended response for a live agent to provide to a customer responsive to a subsequent occurrence of that utterance (or a semantically-similar utterance) by the customer, an automated response for a chat bot to provide by a customer responsive to a subsequent occurrence of that utterance (or a semantically-similar utterance) by the customer, and/or the like. In this regard, the performance metrics or KPIs associated with the different semantic groups, conversation clusters, and representative utterances provide visibility into the unstructured conversational data that allows an administrative user or other CRM leader to identify key drivers of conversations (e.g., the most frequent and/or highest cost issues, contact reasons or topics) and create new automations or recommendations that solve, address, or are otherwise responsive to these key drivers (e.g., to reduce the number or duration of subsequent conversations that would otherwise be assigned to a particular contact reason or topic group).

For purposes of explanation, but without limitation, the subject matter may be described herein in the context of a customer relationship management (CRM) system or service, where conversational interactions between customers and business representatives (e.g., a sales representative, a customer support representative, a chat bot or other automated agent, and/or the like) are automatically mapped to different contact reason semantic groups, which contain different clusters (or contact reason subgroups) and constituent conversations associated with that particular contact reason. By automatically identifying and mapping unstructured conversations to a structured form that supports CRM automations, the subject matter described herein allows CRM leaders to understand what their customers are needing support for, track key KPIs across these issues, and plan and implement automations (such as creating intents and chat bots) using the provided insights around what contact reasons are driving KPIs. In this regard, the subject matter described herein provides visibility into what company representatives and customers are saying within conversations without requiring manual review of the conversations, and automatically recommends or suggests actions the leaders can make within their CRM systems to improve their KPIs. In contrast to existing text analytics tools or systems that require the creation of rote systems that company representatives must follow (such as robotic process automation), the subject matter described herein supports analyzing natural dynamic conversations as recorded in a transcript (or log, thread, feed, or the like) for providing structure post-interaction. The conversational interactions between customers and businesses representatives are semantically organized into cohesive contact reason groups with associated KPIs that enable CRM leaders to take action to better solve and support these contact reasons. By recommending platform actions and automations to improve KPIs of contact reasons and processes, CRM leaders can create recommendations or tools for agent assist elements for chat bots and other automations, thereby improving KPIs and user experience while reducing costs and time devoted to recurring common contacts.

FIG. 1 is a block diagram depicting an exemplary computing system 100 that can implement aspects of the described systems, apparatus, methods and techniques. The exemplary computing system 100 includes a prediction system 101 and an application 102 such as a customer relationship management (CRM) application. The exemplary CRM application 102 can be used for conversational interactions or to capture information regarding customer objects and contacts. An object may be any number of data items such as an object from a customer, an object about a customer, and others. The exemplary CRM application 102 is connected to a repository 107 containing a pre-existing, user provided data set of objects.

The exemplary prediction system 101 includes a prediction module 103 and a model generation module 106. The exemplary prediction module 103 includes a predictive model 104 and a GUI module 105. The exemplary predictive model 104 is configured to analyze a new object received by the exemplary CRM application 102, predict a likely field value for one or more fields, based on the object analysis, provide the predicted field values to the exemplary CRM application 102, and calculate a predicted confidence level for each predicted field value. The exemplary model generation module 106 is configured to train the predictive model 104 using machine learning techniques and in accordance with user selected preferences.

The exemplary prediction system 101 is implemented by a controller. The controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in implementing the exemplary prediction system 101.

The instructions may include one or more separate programs, each of which comprises an ordered listing of executable instructions for implementing logical functions. The instructions, when executed by the processor, receive and process data, perform logic, calculations, methods and/or algorithms for implementing the exemplary prediction system 101.

It will be appreciated that while this exemplary implementation is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain implementations.

The exemplary model generation module 106 includes a GUI module 108 and a training module 110. The exemplary GUI module 108 is configured to provide a user interface for user selection of options for operation of the prediction module 103. The exemplary training module 110 is configured to train the predictive model 104 using reinforced learning and/or other machine learning techniques.

The exemplary GUI module 108 is configured to provide a user interface for user selection of the one or more user selected fields within the exemplary CRM application 102. The user is provided a user interface that allows the user to indicate a desire to select one or more fields within the exemplary CRM application for which predicted field values will be provided.

The exemplary training module 110 in the exemplary model generation module 106 is configured to train the prediction model 104 after user selection of fields for prediction. To train the predictive model 104, the exemplary training module 110 is configured to analyze the pre-existing, user provided data set of objects in the repository 107 for relationships between the user selected fields and content in the objects in the data set (e.g., content in the title and body of message objects). The exemplary training module 106 is configured to train, based on the analysis, the predictive model 104 to predict field values and a confidence level for the prediction.

During the training phase, the exemplary training module 110 is also configured to determine, for each user selected field based on the analysis, a confidence function for the predictive model 104. The exemplary training module 110 is configured to determine the confidence function by testing the accuracy of predictions from the predictive model 104. The exemplary confidence function identifies the percentage of field values for a field that were predicted correctly by the trained predictive model 104 at different applied confidence levels, the percentage of field values for the field that were predicted incorrectly by the trained predictive model 104 at different applied confidence levels, and the percentage of instances for a field in which the trained predictive model 104 could not provide a prediction at different applied confidence levels.

The exemplary GUI module 108 may be configured to provide a user interface for user review of the confidence function for a user selected field and for user selection of a confidence threshold level to be used with the predictive model 104 for the user selected field. For example, a GUI may include a user selectable button that allows a user to instruct the exemplary model generation module 106 to allow the user to review the confidence function for a user selected field and to select a confidence threshold level to be used with the predicting model 104 for the user selected field. For example, at a 60% confidence level the predictive model 104 is expected to correctly predict the field value for the user selected field 97% of the time based on the performance of the predictive model on the training data set. At the 60% confidence level, the predictive model 104 is expected to incorrectly predict the field value for the user selected field 3% of the time based on the performance of the predictive model on the training data set. At the 60% confidence level, the predictive model 104 is expected to not provide a prediction at different applied confidence levels 0% of the time based on the performance of the predictive model on the training data set. The exemplary model generation module 106 may be configured to select an optimal confidence threshold level and/or allow the user to alter the confidence threshold level.

The exemplary model generation module 106 is also configured to provide, for user selection via the user interface, an option for the predictive model 104 to identify a predicted field value as a best recommendation. The confidence threshold level is used to determine the best recommendation, wherein predicted field values determined by the predictive model 104 that have an associated confidence level that is below the confidence threshold level will not be recommended as a best recommendation. Predicted field values determined by the predictive model 104 that have an associated confidence level that is equal to or above the confidence threshold level can be recommended by the predictive model 104 as a best recommendation via a visual indication. The model generation module 106 may also be configured to provide an option, for user selection via the user interface, for the predictive model 104 to automatically apply the best recommendation as a field value without user confirmation of the application of the best recommendation as a field value.

The exemplary model generation module 106 may be configured to provide an option, via the user interface, to activate the prediction module 103 for use with the exemplary CRM application 102. When activated for use with the exemplary CRM application 102 and the exemplary CRM application 102 receives a new object, the exemplary predictive model 104 is utilized to predict field values for the user selected fields based on content in the new object. Depending on the implementation, the GUI module 105 may be configured to automatically enter predicted field values in user selected fields or alternatively present the user with predicted field value options as recommendations for selection or entry.

Figure 2:
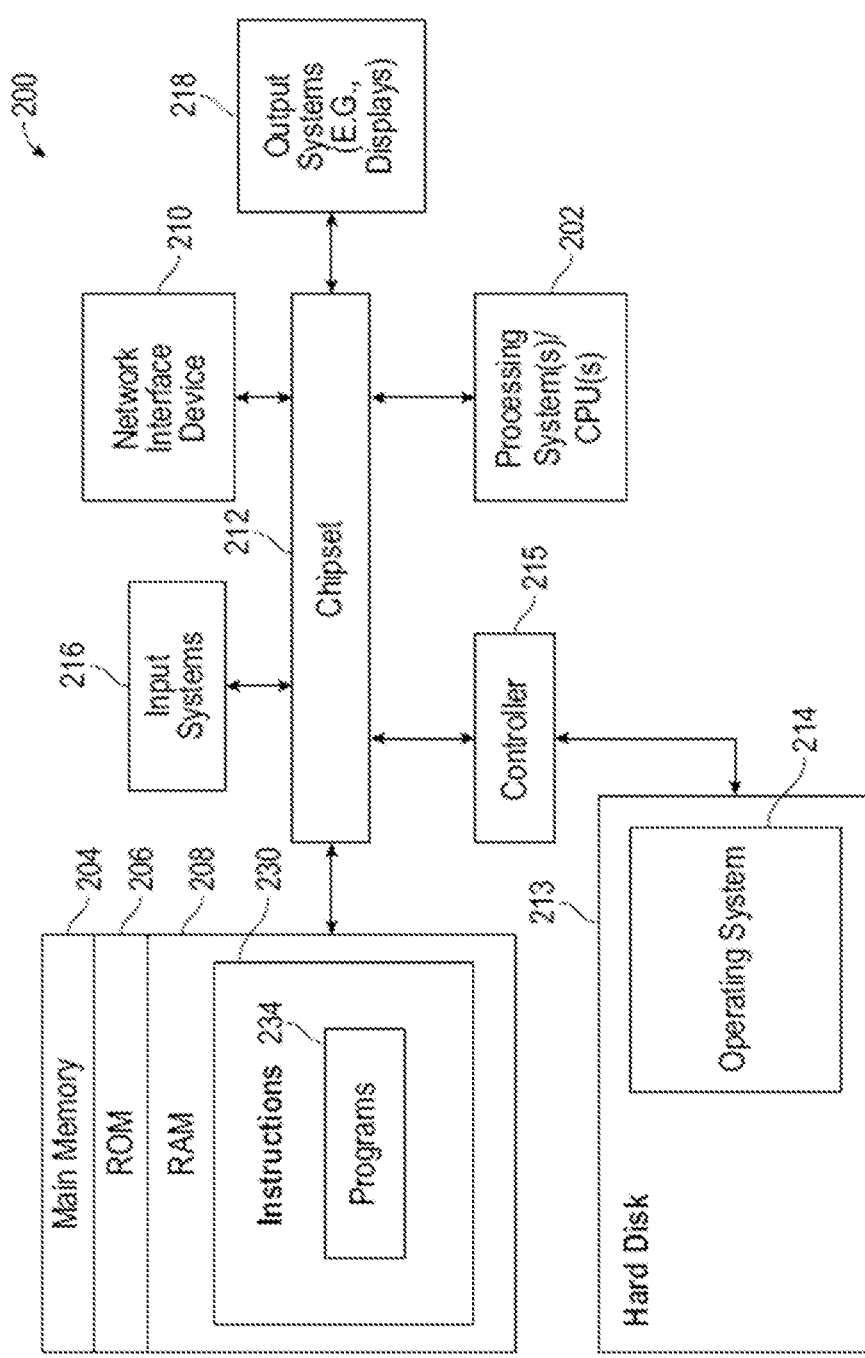
FIG. 2 is a schematic block diagram of an exemplary computer system that can be used to implement the techniques and methods described herein, in accordance with one or more implementations.

FIG. 2 is a schematic block diagram of an example computer system that can be used to implement the techniques and methods described herein. The exemplary computer system can include one or more processing system(s) 202, main memory 204, a network interface device (NID) 210, a chipset 212, a hard disk 213 and hard disk controller 215, input systems 216, and output systems 218.

The chipset 212 is usually located on a motherboard and is a set of electronic components (e.g., in an integrated circuit) that interconnects and manages the data flow between the processing system(s) 202 and other elements of the computer system and connected peripherals. For instance, the chipset 212 provides an interface between the processing system(s) 202 and the main memory 204, and also includes functionality for providing network connectivity through the NID 210, such as a gigabit Ethernet adapter. The chipset 212 typically contains the processor bus interface (also known as a front-side bus), memory controllers, bus controllers, I/O controllers, etc.

Processing system(s) 202 represents one or more general-purpose processing devices such as a microprocessor, central processing unit, or the like. More particularly, the processing system(s) 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 202 may also be one or more special-purpose processing devices such as an application specific integrated circuit (ASIC), a field programmable gate array (FPGA), a digital signal processor (DSP), network processor, or the like.

The processing system(s) 202 can include one or more central processing units (CPUs) that operate in conjunction with the chipset 212. The processing system(s) 202 perform arithmetic and logical operations necessary for the operation of the exemplary computer system.

The NID 210 is capable of connecting the exemplary computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 216 (or input device(s)) allow a user to input information to the computer system and can include things such as a keyboard, a mouse or other cursor pointing device, a pen, a voice input device, a touch input device, a webcam device, a microphone, etc. Output system(s) 218 (or output device(s)) present information to the user of the computer system and can include things such as a display, monitor, speakers, or the like.

The chipset 212 can provide an interface to various forms of computer-readable storage media including a main memory 204 (e.g., read-only memory (ROM), flash memory, dynamic random access memory (DRAM) such as synchronous DRAM (SDRAM)), and hard disk 213. The processing system(s) 202 can communicate with the various forms of computer-readable storage media via the chipset 212 and appropriate buses.

A hard disk 213 is a form of non-volatile memory that can store an operating system (OS) 214. The operating system 214 is software that is copied into RAM and executed by the processing system(s) 202 to control the operation of the exemplary computer system, manage computer hardware and software resources, and provide common services for computer programs executed by the processing system(s) 202. Regardless of the implementation, the operating system 214 includes many different "components" that make the different parts of the exemplary computer system work together. The disk controller 215 is the controller circuit which enables the processing system 202 to communicate with a hard disk 213, and provides an interface between the hard disk 213 and the bus connecting it to the rest of the system.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 202) may be distributed throughout the exemplary computer system.

The ROM 206 of the main memory 204 can be used to store firmware that includes program code containing the basic routines that help to start up the exemplary computer system and to transfer information between elements within the exemplary computer system. The ROM of the main memory 204 may also store other software components necessary for the operation of the exemplary computer system.

The RAM 208 stores programs/instructions 230 or executable code for one or more programs 234 that can be loaded and executed at processing system(s) 202 to perform various functions. The programs/instructions 230 are computer readable program code that can be stored in RAM 208 (or other a non-transitory computer readable medium of the exemplary computer system) that can be read and executed by processing system(s) 202 to perform various acts, tasks, functions, and steps as described herein. The methods and techniques described herein can be captured in programming instructions 230 for execution by the processing system 202 to cause the exemplary computer system to perform the described methods, processes, and techniques.

Some implementations support a chat messaging interface, which is a graphical element provided by a GUI or other presentation interface that enables a user to communicate with another chat participant. Typically, a chat messaging interface is implemented as a widget or window-inside-browser-window that is smaller than the browser tab or browser window. That said, the subject matter described herein is not limited to web browsers, and may be implemented in an equivalent manner in the context of other local client applications, on-demand applications, and/or the like. The chat messaging interface is configured to present user-entered communications and communications received by the client device and directed to the user from other chat participants.

Figure 3:
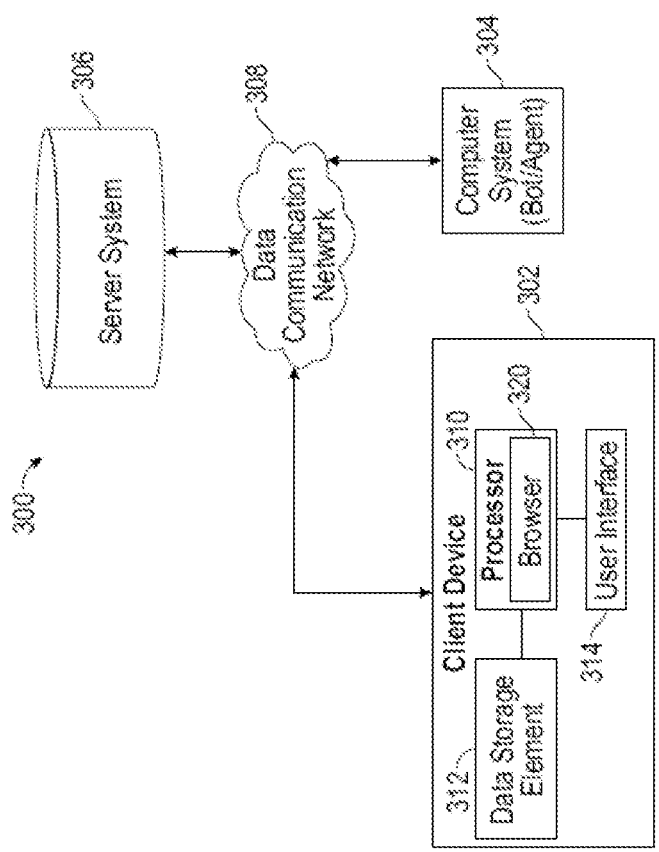
FIG. 3 is a block diagram of a system for providing communication sessions over a network in accordance with one or more implementations.

FIG. 3 depicts a block diagram of a system 300 for providing browser-based, communication session continuity for rendering conversation content via a messaging application for a browser-based presentation interface. As shown, the system 300 includes a client device 302 for operation by a user. The client device 302 may be implemented using a standalone personal computer, a portable computer (e.g., a laptop, a tablet computer, or a handheld computing device), a computer integrated into another device or system (e.g., a "smart" television, a smartphone, or a smartwatch), or any other device or platform including at least one processor 310, a data storage element 312 (or memory), and a user interface 314 to allow a user to interact with the client device 302. The user interface 314 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 302.

In the illustrated implementation, the client device 302 is capable of communicating with a remote server system 306 via a data communication network 308. The data communication network 308 may be any digital or other communications network capable of transmitting messages or data between devices, systems, or components. In certain implementations, the data communication network 308 includes a packet switched network that facilitates packet-based data communication, addressing, and data routing. The packet switched network could be, for example, a wide area network, the Internet, or the like. In various implementations, the data communication network 308 includes any number of public or private data connections, links or network connections supporting any number of communications protocols. The data communication network 308 may include the Internet, for example, or any other network based upon TCP/IP or other conventional protocols. In various implementations, the data communication network 308 could also incorporate a wireless and/or wired telephone network, such as a cellular communications network for communicating with mobile phones, personal digital assistants, and/or the like. The data communication network 308 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 306 may include one or more remotely located servers, and the server system 306 provides data for presentation via the browser application 320 that is stored, maintained, executed, or otherwise supported by the client device 302. The server system 306 may provide internet-based data, intranet-based data, chat or messaging application data, communication session identifiers or other connection data, and any applicable data originating from a potential secondary computer system 304. The server system 306 may include any number of application servers, and each server may be implemented using any suitable computer. In some implementations, the server system 306 includes one or more dedicated computers. In some implementations, the server system 306 includes one or more computers carrying out other functionality in addition to server operations. In exemplary implementations, the server system 306 operates within a client-server architecture, executing programs to serve the requests of other programs (e.g., a browser application 320 executed by the client device 302).

One or more application servers of the server system 306 maintains and provides web-based data which enables users to interact over the Internet or an intranet. The client device 302 interacts with the server system 306 in such a way that the client device 302 provides data communications to the server system 306 and receives data communications from the server system 306. In certain implementations, the server system 306 may act as an intermediary for a chat messaging session between the client device 302 and another computer system 304, wherein the server system 306 receives data communications from the computer system 304 that are directed to the client device 302, wherein the server system 306 receives computer system 304 data communications and the server system 306 then forwards the computer system 304 data communications to the client device 302 as part of a particular functionality of a browser application that is maintained, executed, and utilized via the client device 302. For example, when the client device 302 initiates a chat application or messaging application via the browser application, the computer system 304 may be operated by a customer service agent or other chat participant communicating with the user of the client device 302 via the chat messaging application. However, in the illustrated implementation, the computer system 304 does not communicate with the client device 302 directly. Instead, the server system 306 provides chat messaging application data, including functionality associated with the chat messaging application itself, and also including transmitted messages from the agent using the computer system 304 which have been sent to the server system 306 first and then forwarded as part of the chat messaging application data communications transmitted to the client device 302 throughout the duration of the chat messaging session.

During typical operation, the client device 302 executes a browser application 320 that presents a GUI display for the browser application, with the browser application 320 being utilized to establish a communication session with the server system 306 to exchange communications between the client device 302 and the server system 306 (e.g., by a user inputting a network address for the server system 306 via the GUI display of the browser application). The GUI display may be realized as a browser tab or browser window that provides a corresponding chat messaging interface or "chat window" through which a user can exchange chat messages with other parties. The user of the client device 302 can use the chat messaging interface to exchange messages with a live agent operator of the computer system 304, where the computer system 304 is realized as another instance of the client device 302 that is utilized by another human user in an equivalent manner as the client device 302. Alternatively, the computer system 304 could be configured to support or otherwise provide an automated agent (e.g., a "chat-bot") configured to exchange chat messages with users originating from the computer system 304 or the server system 306. Chat messages exchanged via the chat messaging interface may include text-based messages that include plain-text words only, and/or rich content messages that include graphical elements, enhanced formatting, interactive functionality, or the like.

In one or more implementations, the data storage element 312 stores or otherwise maintains chat messaging data using a storage format and storage location such that the chat messaging data may be later retrieved for use. For example, text-based chat messages that are presented in a plain-text format may be stored or otherwise maintained in a string format. In some implementations, rich content chat messages may also be locally stored by the browser application, for example, as JavaScript Object Notation (JSON) objects. The chat messaging data may be analyzed at the client device 302 and/or the computer system 304 upon termination of a chat messaging session, or the chat messaging data may be uploaded or otherwise transmitted from the client device 302 and/or the computer system 304 for analysis at the server system 306.

Figure 4:
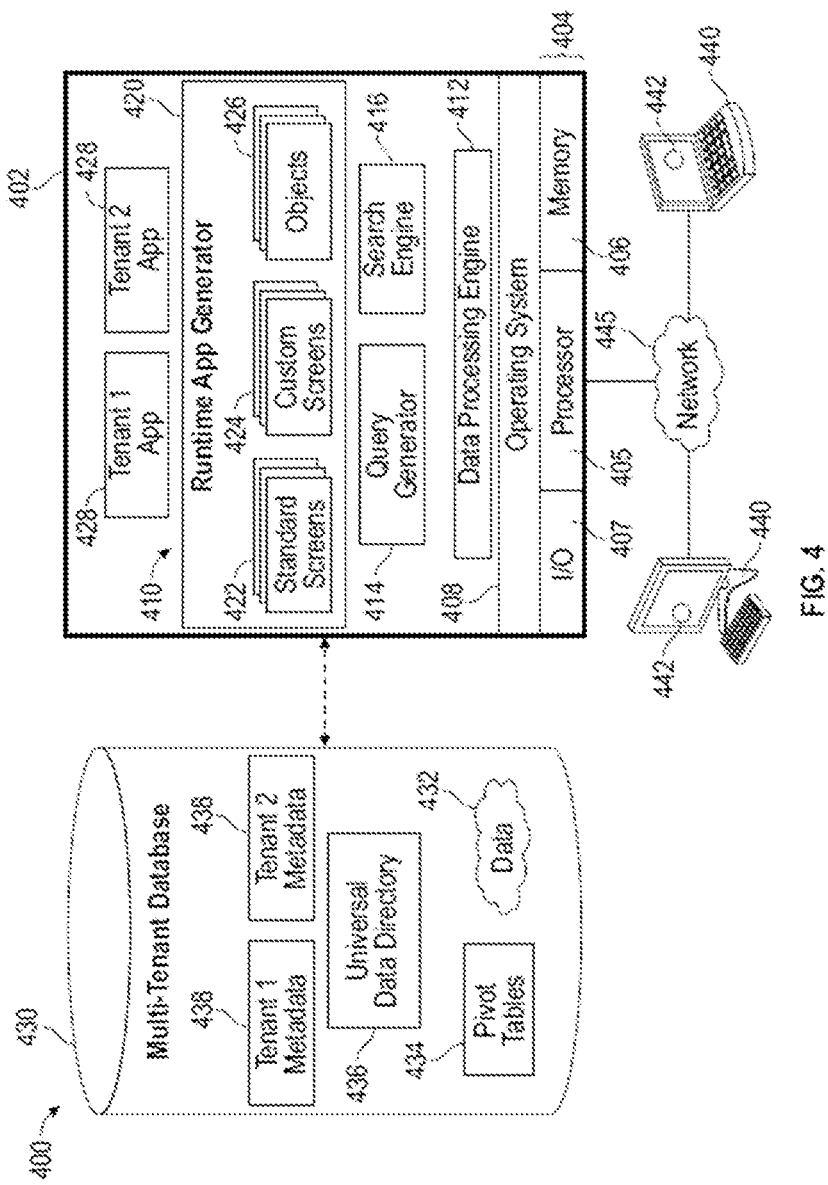
FIG. 4 is a block diagram of an exemplary multi-tenant database system suitable for use with the system of FIG. 1 and/or the system of FIG. 3 in accordance with one or more implementations.

FIG. 4 is a block diagram of an exemplary multi-tenant database system 400 suitable for use with one or more of the systems 100, 300 described above, in accordance with the disclosed implementations. The illustrated multi-tenant database system 400 of FIG. 4 includes a server 402 (e.g., server system 306) that dynamically creates and supports virtual applications 428 based upon data 432 from a common database 430 that is shared between multiple tenants, alternatively referred to herein as a multi-tenant database. Data and services generated by the virtual applications 428 are provided via a network 445 (e.g., data communication network 308) to any number of client devices 440 (e.g., client device 302, live agent computer system 304, or the like), as desired. Each virtual application 428 is suitably generated at run-time (or on-demand) using a common application platform 410 that securely provides access to the data 432 in the database 430 for each of the various tenants subscribing to the multi-tenant system 400. In one or more implementations, the subject matter described herein is implemented in the context of the multi-tenant database system 400, where the chat messaging widgets are integrated with or otherwise provided within instances of one or more virtual applications 428 generated by the server 402.

In accordance with one non-limiting example, the multi-tenant system 400 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

The multi-tenant database 430 is any sort of repository or other data storage system capable of storing and managing the data 432 associated with any number of tenants. The database 430 may be implemented using any type of conventional database server hardware. In various implementations, the database 430 shares processing hardware 404 with the server 402. In other implementations, the database 430 is implemented using separate physical and/or virtual database server hardware that communicates with the server 402 to perform the various functions described herein. In an exemplary implementation, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various implementations, the data 432 is suitably organized into a relatively small number of large data tables to maintain a semi-amorphous "heap"-type format. The data 432 can then be organized as needed for a particular virtual application 428. In various implementations, conventional data relationships are established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 434 and/or the metadata 438 to generate "virtual" components of the virtual applications 428 to logically obtain, process, and present the relatively amorphous data 432 from the database 430.

The server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 407 and the like. The input/output features 407 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long term storage or other computer-readable media capable of storing programming instructions for execution on the processor 405, including any sort of random access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 406 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical implementation, the application platform 410 gains access to processing resources, communications interfaces and other features of the processing hardware 404 using any sort of conventional or proprietary operating system 408. The virtual applications 428 are typically generated at run-time in response to input received from the client devices 440. For the illustrated implementation, the application platform 410 includes a bulk data processing engine 412, a query generator 414, a search engine 416 that provides text indexing and other search functionality, and a runtime application generator 420. Each of these features may be implemented as a separate process or other module, and many equivalent implementations could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various implementations, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical implementation, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Each database 430 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 400, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems 400, tenants may be allowed to create and store custom objects, or they may be allowed to customize standard entities or objects, for example by creating custom fields for standard objects, including custom index fields. U.S. Pat. No. 4,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 400. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 4, the data processing engine 412 performs bulk processing operations on the data 432 such as uploads or downloads, updates, online transaction processing, and/or the like. In many implementations, less urgent bulk processing of the data 432 can be scheduled to occur as processing resources become available, thereby giving priority to more urgent data processing by the query generator 414, the search engine 416, the virtual applications 428, etc.

In exemplary implementations, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 438 in the database 430. In this regard, the object type defines the structure (e.g., the formatting, functions and other constructs) of each respective object 426 and the various fields associated therewith.

Still referring to FIG. 4, the data and services provided by the server 402 can be retrieved using any sort of personal computer, mobile telephone, tablet or other network-enabled client device 440 on the network 445. In an exemplary implementation, the client device 440 includes a display device, such as a monitor, screen, or another conventional electronic display capable of graphically presenting data and/or information retrieved from the multi-tenant database 430. Typically, the user operates a conventional browser application or other client program 442 executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other implementations may simply provide dynamic web or other content that can be presented and viewed by the user, as desired.

Figure 5:
FIG. 5 is a flow diagram illustrating a conversation mapping process suitable for use with a computing system according to some exemplary implementations.

FIG. 5 depicts an exemplary conversation mapping process 500 that may be implemented or otherwise performed by a computing system to automatically assign conversations to different semantic groups and perform additional tasks, functions, and/or operations described herein. In one or more implementations, the conversation mapping process 500 is implemented or otherwise performed by a conversation mining service associated with an application platform (e.g., application platform 410) supported by an application server (e.g., server 402) associated with a database system (e.g., multi-tenant database system 400). For illustrative purposes, the following description may refer to elements mentioned above in connection with FIGS. 1-4. It should be appreciated that the conversation mapping process 500 may include any number of additional or alternative tasks, the tasks need not be performed in the illustrated order and/or the tasks may be performed concurrently, and/or the conversation mapping process 500 may be incorporated into a more comprehensive procedure or process having additional functionality not described in detail herein. Moreover, one or more of the tasks shown and described in the context of FIG. 5 could be omitted from a practical implementation of the conversation mapping process 500 as long as the intended overall functionality remains intact.

For purposes of explanation, the subject matter may be described herein in the context of a system that analyzes historical conversation data to automatically identify different contact reasons within the historical conversations and assigns conversations to different contact reason semantic groups. Mapping or assigning semantically similar conversations to different contact reason groups facilitates more granular conversation analytics and business intelligence regarding the different contact reasons. Within contact reason semantic groups, different subsets or clusters of conversations may be analyzed to facilitate creation of new chat bot actions or other automations or recommendations. By virtue of mapping unstructured conversations to different semantic groups improving the visibility of semantically similar conversations and KPIs associated therewith, recommendations or automations specific to individual contact reasons may be created to address contact reasons and improve KPIs. That said, it will be appreciated that the subject matter described herein is not limited to contact reason or any other type of semantic groups, and the subject matter may be implemented in an equivalent manner to support any number of different types of semantic groups, as may be desired. Moreover, the subject matter described herein is not necessarily limited to linguistics and/or semantic groups and could be implemented in an equivalent manner in other domains and/or for any sort of ontological groups.

In one or more implementations, the conversation mapping process 500 is supported or otherwise implemented by an application platform at a server of a database system (e.g., the application platform 410 at the server 402 of the database system 400) to analyze conversation data records maintained in a database of the database system (e.g., as data 432 in the database 430). For example, the database may include a table of entries corresponding to data records having the conversation database object type, where the entry for each conversation data record includes a conversation identifier field associated with the respective conversation data record that uniquely identifies the respective conversation, a conversation channel field that identifies the channel used to initialize the conversation (e.g., telephone or a call center, chat bot, text message, a website or web form, a record feed, and/or the like), a representative utterance field that includes a representative utterance or other semantic representation of the respective conversation, and one or more fields that include identifiers or references to the particular cluster groups and/or semantic groups the respective conversation is automatically assigned to, as described herein. The conversation identifier field may be utilized to maintain an association between the particular conversation data record and the transcript, log, feed, thread or other container or collection of utterances associated with the respective conversation. For example, in one implementation, the database includes one or more tables of conversation entries corresponding to each utterance, message or other event of a conversation, where each respective entry for a particular utterance includes a conversation identifier field for maintaining the unique conversation identifier associated with the conversation data record to which the respective utterance belongs, along with other fields identifying the particular user, speaker or actor that is the source of the respective utterance, a particular type or class associated with the source of the respective utterance (e.g., an agent, a bot, an end user, a supervisor, or the like), the textual content of the respective utterance, and the timestamp, duration or other temporal information associated with the respective utterance.

For a given conversation data record, the conversation identifier associated with that conversation data record may be utilized to retrieve the corresponding conversation entries associated with that conversation, which, in turn, may be analyzed as part of the conversation mapping process 500 to determine the representative utterance or other semantic representation of the respective conversation to be associated with or otherwise assigned to that conversation data record (e.g., by autopopulating the representative utterance field of the conversation data record with the representative utterance). The conversation mapping process 500 utilizes the representative utterance to automatically assign a particular conversation to one or more cluster groups underneath a top-level semantic group, and thereby autopopulates the cluster group and semantic group fields associated with the conversation data record. Moreover, the timestamps or other temporal information for the conversation entries associated with that conversation may be analyzed or otherwise utilized to calculate one or more statistics or metrics associated with the conversation (e.g., the conversation duration, the conversation length, and/or the like), which, in turn, may be utilized along with corresponding statistics or metrics associated with other conversations assigned to a common cluster group or semantic group to determine corresponding performance metrics, statistics or other KPIs associated with the respective cluster group or semantic group, as described herein. In this regard, it should be noted that in some implementations, each conversation data record may be associated with one or more different types of data records, such as a case database object type, where fields of values associated with those related records may be utilized in connection with determining performance metrics, statistics or other KPIs associated with the respective cluster group or semantic group. For example, the values for the status field (e.g., new, closed, escalated, etc.) of case data records associated with different conversation data records assigned to a common cluster group may be utilized to determine corresponding statistics that represent the case status performance or relative distribution of case statuses for the conversations assigned to that cluster group (e.g., the percentage of conversations associated with a particular contact reason that resulted in closing a case, the percentage of conversations associated with a particular contact reason that resulted in escalating a case, etc.).

Referring to FIG. 5, in exemplary implementations, the conversation mapping process 500 retrieves or otherwise obtains historical conversational data and analyzes the discrete conversations contained therein to identify a representative utterance with that respective conversation (tasks 502, 504). For example, in exemplary implementations, a computing system, such as the server system 306 or the database system 400, includes or is otherwise associated with a database or other data storage that stores or otherwise maintains transcripts or logs of conversations between different users (e.g., different instances of client device 302) and agents (e.g., different instances of computer system 304), which depending on the scenario could be a human user (e.g., a customer support representative, a sales representative, or other live agent) or an automated actor (e.g., a chat bot). In this regard, each conversation may have an associated transcript that maintains the sequence of utterances associated with the conversation and the respective speaker, actor or source of each respective utterance that makes up the conversation. For example, as described above, in one or more implementations, for each conversation, a corresponding conversation data record is created or otherwise instantiated in the database, with the conversation identifier being utilized to maintain an association between the conversation and the different conversation entry data records that maintain the different utterances associated with the conversation. The transcript of each conversation is analyzed to identify, from among the various utterances of the conversation, a representative utterance that is likely to be the most semantically significant utterance of the conversation or the utterance of the conversation that is most likely to convey the intent or sentiment of the conversation. For example, for each transcript of a chat between a customer and an agent (e.g., a live agent and/or chat bot), the utterances of the chat may be analyzed to identify the customer utterance that best expresses the contact reason (e.g., why the customer initiated contact with the agent).

Figure 6:
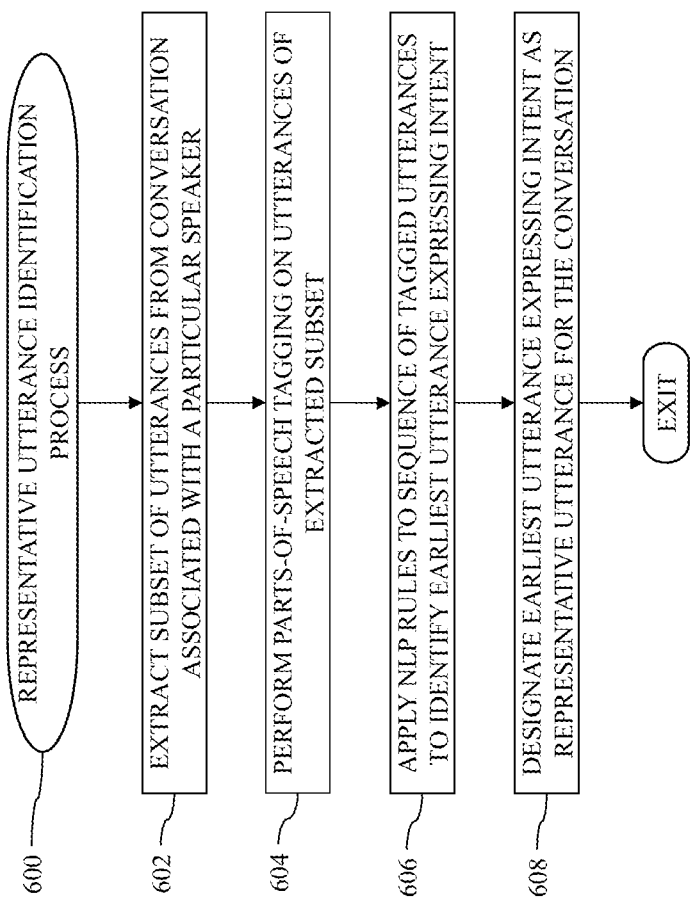
FIG. 6 is a flow diagram illustrating a representative utterance identification process suitable for use with the conversation mapping process of FIG. 5 according to some exemplary implementations.

FIG. 6 depicts an exemplary representative utterance identification process 600 that may be implemented or otherwise performed by a computing system in connection with the conversation mapping process 500 (e.g., at task 504) to identify the representative utterance associated with a respective conversation and perform additional tasks, functions, and/or operations described herein. For illustrative purposes, the following description may refer to elements mentioned above in connection with FIGS. 1-4. It should be appreciated that the representative utterance identification process 600 may include any number of additional or alternative tasks, the tasks need not be performed in the illustrated order and/or the tasks may be performed concurrently, and/or the representative utterance identification process 600 may be incorporated into a more comprehensive procedure or process having additional functionality not described in detail herein. Moreover, one or more of the tasks shown and described in the context of FIG. 6 could be omitted from a practical implementation of the representative utterance identification process 600 as long as the intended overall functionality remains intact.

The illustrated utterance identification process 600 extracts or otherwise identifies, from the transcript of a conversation, the subset of utterances that are associated with a particular speaker or source (task 602). For example, to identify the contact reason for why a customer initiated the conversation or interaction with an agent, the representative utterance identification process 600 selectively identifies the subset of utterances associated with the customer by filtering or otherwise excluding from consideration the utterances by the agent. Thereafter, the representative utterance identification process 600 performs parts of speech tagging on the subset of utterances by the customer before applying one or more natural language processing logic rules to the sequence of tagged customer utterances to identify the earliest utterance in the sequence of tagged customer utterances that is most likely to express the customer's intent (e.g., the contact reason) (tasks 604, 606). In this regard, each customer utterance is analyzed sequentially in order to determine, based on the tagged parts of speech associated with the respective utterance, whether it is sufficiently likely to express the contact reason. In this regard, utterances are parsed by applying NLP to identify syntax that consists of a verb followed by a noun or other subject, which is capable of expressing intent. For example, an NLP tool may be utilized to parse an utterance to identify the part-of-speech tags of each word and its dependency path to determine whether it contains a verb and noun or subject pattern that is capable of expressing intent. When an utterance including the desired syntax capable of expressing intent is identified, the NLP tool also analyzes the phrase having the desired syntax to verify or otherwise confirm that the phrase is non-trivial, by excluding verbs, nouns, or combinations thereof that are unlikely to express intent (e.g., verifying the verb is not the word "thank" or variants thereof when the noun or subject of the verb is not a pronoun). Once the representative utterance identification process 600 identifies the earliest utterance likely to express the intent of the conversation, the representative utterance identification process 600 designates or otherwise assigns the identified utterance as the representative utterance associated with the conversation (task 608). For example, a record or entry in a database that maintains the transcript or other conversational data associated with an individual conversation may be updated to include a field of metadata for the representative utterance associated with the conversation that includes the words or text of the identified utterance.

Referring again to FIG. 5, it should be appreciated that the representative utterance identification process 600 is merely one exemplary implementation of a method for identifying the representative utterance associated with a respective conversation at task 504 and is not intended to be limiting. For example, machine learning or other artificial intelligence techniques may be applied to the utterances of a conversation to identify the representative utterance associated with that conversation before storing or otherwise maintaining the representative utterance output by the resulting model as metadata associated with the respective conversation. Additional exemplary implementations for identifying a representative utterance are described in greater detail in U.S. patent application Ser. No. 17/933,391, which is incorporated by reference herein in its entirety.

Referring again to FIG. 5, in exemplary implementations, after assigning representative utterances to the different conversations (e.g., by performing the utterance identification process 600 described above), the conversation mapping process 500 continues by clustering or otherwise grouping the various different conversations into different cluster groups of semantically similar conversations based on their assigned representative utterances (task 506). In this regard, the representative utterances are used to assign conversations to different cluster groups, where the member conversations assigned to each cluster group have an associated representative utterance that is semantically similar to the representative utterances for the other conversations belonging to that same cluster group. The clustering of conversations may be performed at different levels of granularity by increasing or decreasing the number of cluster groups or adjusting thresholds or other clustering criteria that influences the size or number of cluster groups (e.g., a maximum number of conversations per cluster group, a minimum number of conversations per cluster group, and/or the like). Moreover, in practice, cluster groups may be hierarchically arranged, such that each conversation can be assigned to a lower level cluster group, with the lower level cluster groups being assigned to intermediate cluster groups that can include conversations assigned to multiple different lower level groups, with the intermediate level cluster groups being assigned to a higher level cluster group that can include conversations assigned to multiple different lower level and/or intermediate level groups. For example, in one implementation, conversations are initially clustered into 100 different low level cluster groups to provide a relatively higher level of granularity, before being clustered into 50 different intermediate cluster groups to provide an intermediate level of granularity (where an intermediate cluster group may include conversations assigned to different higher granularity cluster groups), which are further clustered into 20 different high level cluster groups. That said, in other implementations, the conversation mapping process 500 may automatically determine an optimal number of cluster groups. For example, the level of granularity of the clustering of conversations (e.g., lesser or greater number of clusters) is automatically determined by adjusting the clustering criteria and optimizing the cluster quality, based on measures such as intra-cluster distance (e.g., by reducing intra-cluster distance to provide more compact clusters), inter-cluster distance (e.g., by increasing inter-cluster distance to provide greater separation between clusters) and/or other clustering characteristics or metrics.

Figure 7:
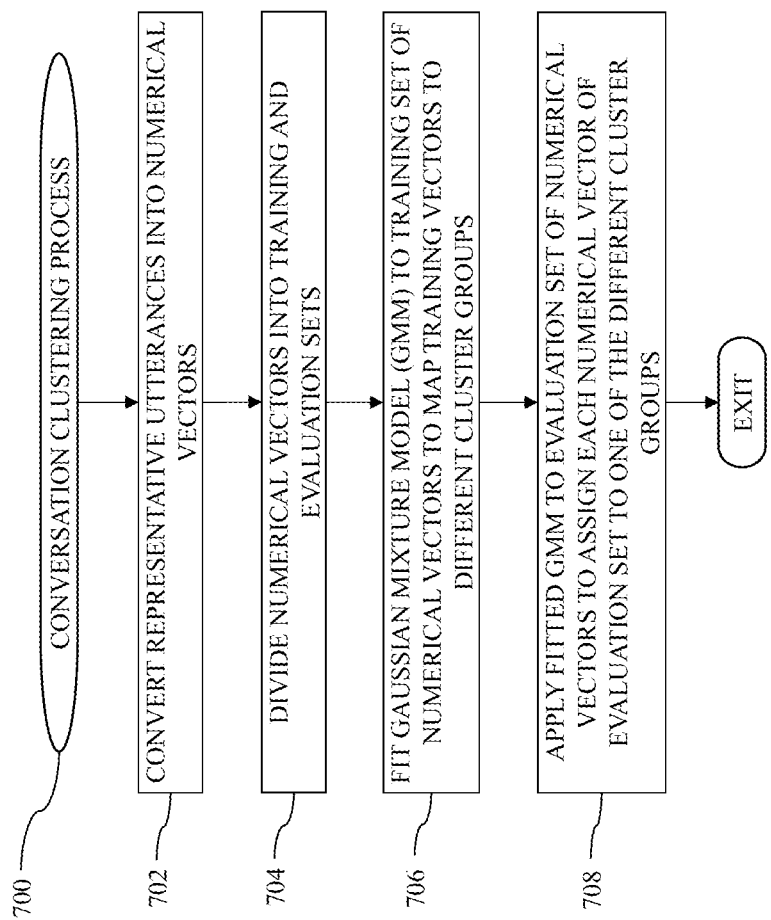
FIG. 7 is a flow diagram illustrating a conversation clustering process suitable for use with the conversation mapping process of FIG. 5 according to some exemplary implementations.

FIG. 7 depicts an exemplary representative conversation clustering process 700 that may be implemented or otherwise performed by a computing system in connection with the conversation mapping process 500 (e.g., at task 506) to cluster conversations based on their associated representative utterances and perform additional tasks, functions, and/or operations described herein. For illustrative purposes, the following description may refer to elements mentioned above in connection with FIGS. 1-4. It should be appreciated that the conversation clustering process 700 may include any number of additional or alternative tasks, the tasks need not be performed in the illustrated order and/or the tasks may be performed concurrently, and/or the conversation clustering process 700 may be incorporated into a more comprehensive procedure or process having additional functionality not described in detail herein. Moreover, one or more of the tasks shown and described in the context of FIG. 7 could be omitted from a practical implementation of the conversation clustering process 700 as long as the intended overall functionality remains intact.

The illustrated conversation clustering process 700 initializes or otherwise begins by converting representative utterances assigned to a particular record to be clustered into numerical vectors (task 702). For example, the text or other content of each representative utterance associated with a particular conversation (e.g., the value of the representative utterance field associated with a conversation data record) may be input to an encoder model (e.g., a universal sentence encoder or the like) to convert or otherwise encode the content of the representative utterance into a numerical vector that numerically is representative of the intent or other semantic characteristics of the respective utterance.

Once each representative utterance is assigned a corresponding encoded numerical vector, the conversation clustering process 700 divides the conversations into training and evaluation subsets (task 704). The conversation clustering process 700 then maps or otherwise clusters the conversations of the training subset into the desired number of cluster groups for the desired level of granularity in accordance with the clustering criteria using the numerical vector representations of the representative utterances for the respective conversations in the training subset (task 706). For example, a Gaussian mixture model (GMM) with a spherical option may be utilized to divide the conversations in the training subset into the desired number of cluster groups by fitting the GMM using the numerical vector representations of the representative utterances for the respective conversations in the training subset. Thereafter, conversations of the remaining subset of conversations are individually assigned to one of the cluster groups identified from the training subset of conversations (task 708), for example, by applying the fitted GMM model to the numerical vector representations of the representative utterances for the respective conversations in the evaluation subset to map the numerical vector representation of a respective representative utterance to one of the cluster groups derived from the training subset. In a similar manner as described above in the context of the representative utterance, once a conversation is assigned to a cluster group, the corresponding record or entry in the database that maintains the transcript or other conversational data associated with the individual conversation may be updated to include metadata that identifies the cluster group(s) to which the respective conversation was assigned in addition to the metadata for the identified representative utterance associated with the respective conversation. For example, a cluster group field (or contact reason field) of a database record for a conversation database object associated with a conversation may be updated to include indicia of the cluster group to which the conversation is assigned based on the representative utterance field of the database record. To control the number of cluster groups, the desired number of cluster groups (or Gaussian components) may be specified when fitting the GMM model, and/or after assigning conversations to a cluster group (or Gaussian component), a bottom-up hierarchical clustering (e.g., agglomerative clustering) may be performed to iteratively identify and combine the most semantically similar clusters into a unified common cluster group until arriving at the desired final number of cluster groups.

In one exemplary implementation, the conversation clustering process 700 results in a set of high-quality cluster groups that are non-overlapping or otherwise distinct from one another, where each conversation of the historical conversations is assigned to a respective one of the cluster groups, independent of whether the conversation is assigned to the training or evaluation subset. In this regard, in some implementations, the cluster groups are analyzed to filter, exclude, or otherwise remove cluster groups exhibiting low quality that are unlikely to be representative of something semantically significant, for example, by eliminating cluster groups having an intra-cluster distance greater than a threshold, an inter-cluster distance less than a threshold, and/or the like. In such implementations, conversations previously assigned to a low quality cluster group may then be reassigned to a higher quality cluster group. In other implementations, conversations previously assigned to a low quality cluster group may be classified into an unassigned group of conversations, where the representative utterances associated with the respective conversations in the unassigned group are dissimilar to the identified cluster groups of conversations.

In some implementations, the conversation clustering process 700 is done separately for different speakers or speaker combinations. For example, conversations may be first divided into one subset of conversations where the speaker for the agent side of the conversation includes or is realized as a chat bot for at least some of the conversation, while the other subset of conversations includes conversations where the speaker for the agent side of the conversation includes or is realized as a live agent or human user for the duration of the conversation. Thus, the clustering step may identify different sets of cluster groups with associated utterances, for each potential combination of agent speaker (e.g., chat bot or live agent) and desired level of granularity. Additionally, in some implementations, cluster quality filtering is applied to ensure that the conversation from the evaluation subset having the highest likelihood or probability of belonging to its resulting cluster group is greater than the average likelihood or probability of belonging to that sample group across the conversations from the training subset, thereby reducing the likelihood of a particular cluster group providing an insignificant differentiation with respect to other conversations. In some implementations, clusters are assigned different variance levels, which may be utilized to map clusters to different levels. For example, the GMM variance for each cluster may be mapped to a particular qualitative level. Additionally, in some implementations, personal identifiable information (PII) masking is employed, for example, by tokenizing each utterance, and if the utterance appears less than a threshold number of times among all the utterances for all of the cluster groups, replacing the utterance with a masked representation in the final output.

Referring again to FIG. 5, it should be appreciated that the conversation clustering process 700 is merely one exemplary implementation of a method for clustering conversations based on their representative utterances at task 506 and is not intended to be limiting. For example, machine learning or other artificial intelligence techniques may be applied to the representative utterance of a conversation (or the numerical vector representation thereof) to identify the cluster group to be assigned to that conversation before storing or otherwise maintaining the cluster group output by the resulting model as cluster group structural metadata associated with the respective conversation. Additionally, it should be noted that, in practice, the conversation mapping process 500 and utterance identification processes 600 described herein are not necessarily limited to conversations and may be implemented in an equivalent manner with respect to any type of records having text fields that are capable of being concatenated, combined or otherwise utilized to generate a semantic representation of a respective record. For example, one or more text fields of a data record for another type of database object (e.g., a case database object) may be concatenated, combined or otherwise utilized to generate a semantic representation of the database record (e.g., by inputting values from the text fields to a summarization model, an encoder model or another suitable machine learning model, performing NLP techniques, or the like). In turn, the semantic representation of a database record derived from text fields of the database record may be utilized in an equivalent manner to the representative utterance to cluster or otherwise group semantically similar database records without requiring exact matches across the text fields of database records (e.g., fuzzy matching or the like).

After identifying different cluster groups for clustering the historical conversations, the illustrated conversation mapping process 500 continues by automatically generating and assigning one or more names to each of the different cluster groups (task 508). For example, in one implementation, for the representative utterances within a respective cluster, noun and verb phrase candidates are gathered or otherwise extracted using parts of speech tagging, deep learning based key phrase extraction, term frequency—inverse document frequency (TF-IDF) and phrase frequency. After identifying a subset of noun and verb candidates having the greatest frequency, a listing of potential names for the cluster group is generated by creating permutations of names by concatenating each verb candidate with each noun candidate and adding the noun phrase candidates having at least a threshold frequency. The list may be ranked, sorted or otherwise ordered in a probabilistic manner (e.g., based on the relative frequencies of the noun and/or verb words or phrases), and in some implementations, the highest ranked name on the list may be assigned to the cluster group, while other implementations may identify a subset of potential names by filtering the list (e.g., to return only the top 5 most probable representations). In another implementation, for each representative utterance in a cluster group, a corresponding intent span is extracted (e.g., nouns (excluding pronouns) and associated verb (if any)), with the intent spans corresponding to the different representative utterances for the conversations assigned to the cluster group being ranked or otherwise lemmatized according to frequency, with the highest ranked name on the list or a subset of highest ranked names (e.g., the top 5) being assigned to the cluster group. In this regard, cluster groups of semantically similar records may be automatically assigned an autogenerated name that encompasses or otherwise conveys the semantic commonality by which the records are grouped, thereby allowing a human user to ascertain or judge the underlying semantic content of the records assigned to that respective cluster group based on the autogenerated group name. Additional exemplary implementations for automatically assigning an autogenerated name to a group of records are described in greater detail in U.S. patent application Ser. No. 17/933,396, which is incorporated by reference herein in its entirety.

Referring again to FIG. 5, after assigning names to the different cluster groups, the illustrated implementation of the conversation mapping process 500 continues by mapping or otherwise assigning different cluster groups to different semantic groups (task 510). In this regard, the different cluster groups are themselves clustered based on semantic similarity to automatically identify a smaller number of hierarchical semantic groups that are distinct from one another and encompass or otherwise include one or more cluster groups beneath them. For example, similar to clustering the representative utterances, a semantic representation (e.g., a cluster group representative utterance, the cluster group name, and/or the like) assigned to each cluster group may be converted into a corresponding numerical representation (e.g., by using an encoder model to obtain a corresponding cluster group name vector), which in turn may be utilized to group semantically similar cluster groups (e.g., based on the cosine similarity between the cluster group name vectors) into a common semantic group that encompasses the semantics of the underlying cluster groups. In this regard, in some implementations, the different autogenerated contact reason group names may be utilized to assign different contact reason cluster groups to a higher level topic group that the different contact reason cluster groups commonly pertain to.

Figure 8:
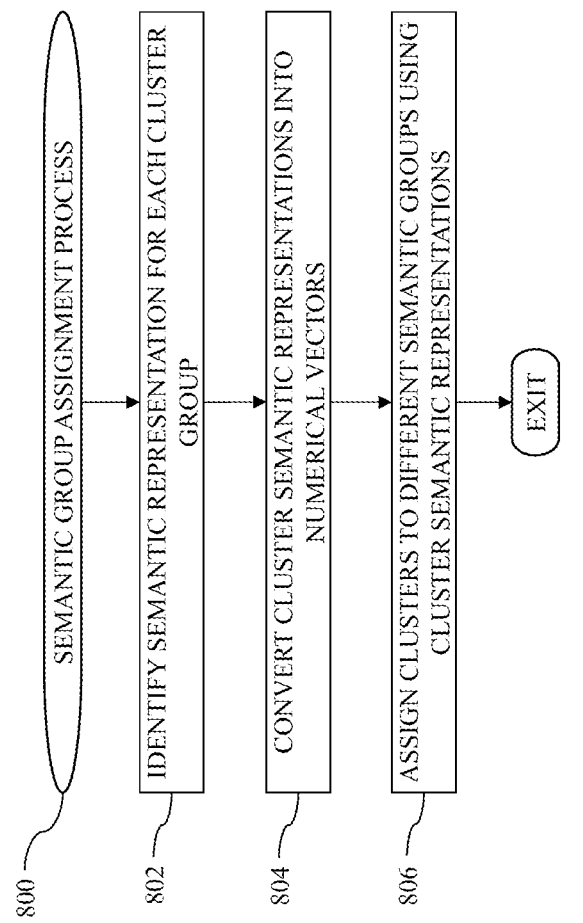
FIG. 8 is a flow diagram illustrating a semantic group assignment process suitable for use with the conversation mapping process of FIG. 5 according to some exemplary implementations.

FIG. 8 depicts an exemplary representative semantic group assignment process 800 that may be implemented or otherwise performed by a computing system in connection with the conversation mapping process 500 (e.g., at task 510) to assign cluster groups of conversations to different semantic groups and perform additional tasks, functions, and/or operations described herein. For illustrative purposes, the following description may refer to elements mentioned above in connection with FIGS. 1-4. It should be appreciated that the semantic group assignment process 800 may include any number of additional or alternative tasks, the tasks need not be performed in the illustrated order and/or the tasks may be performed concurrently, and/or the semantic group assignment process 800 may be incorporated into a more comprehensive procedure or process having additional functionality not described in detail herein. Moreover, one or more of the tasks shown and described in the context of FIG. 8 could be omitted from a practical implementation of the semantic group assignment process 800 as long as the intended overall functionality remains intact.

The illustrated semantic group assignment process 800 initializes or otherwise begins by identifying or otherwise determining a semantic representation for each cluster group based on the conversations assigned to the respective cluster group (task 802). In exemplary implementations, the numerical vectors for the representative utterances associated with the different conversations assigned to a respective cluster group may be analyzed with respect to one another to identify which utterance is most representative of the entire cluster group, for example, by identifying the numerical vector that best represents the center, median and/or mean of the respective cluster group and then utilizing the representative utterance associated with that numerical vector as a reference representative utterance that provides a semantic representation of the cluster group. In this regard, some implementations may combine, average or otherwise utilize the numerical vectors for the representative utterances associated with the different conversations assigned to a respective cluster group to generate a representative cluster group utterance. In other implementations, the semantic group assignment process 800 utilizes the name assigned to the cluster group as the semantic representation of the cluster group for purposes of assigning the cluster group to a semantic group.

Once a cluster group semantic representation corresponding to each cluster group is identified, the semantic group assignment process 800 converts the cluster group semantic representations into corresponding numerical vector representations that are utilized to assign cluster groups to different distinct semantic groups based on the similarity of the cluster group semantic representations (tasks 804, 806). In this regard, in exemplary implementations, an initial number of cluster groups (e.g., 100 cluster groups) may be clustered into fewer semantic groups (e.g., 10 contact reason groups) using a hierarchical clustering technique, such as, for example, agglomerative clustering. That said, in alternative implementations, the clustering process 700 could be repeated with respect to the cluster groups using the semantic representations of the cluster groups as the representative utterances at task 702 to cluster an initial number of cluster groups into fewer semantic groups. In various implementations, in a similar manner as described above in the context of assigning conversations to cluster groups, the size and/or number of semantic groups may be tailored by adjusting thresholds or other criteria that influences the size or number of semantic groups (e.g., a maximum number of conversations per cluster group, a minimum number of conversations per cluster group, and/or the like) or otherwise provides the desired level of separation between semantic groups. For example, the number of semantic groups may be limited to a maximum number of semantic groups, with any smaller semantic groups containing less than a threshold number of cluster groups assigned thereto being merged or consolidated into a catchall semantic group (e.g., "Other").

It should be appreciated that the semantic group assignment process 800 is merely one exemplary implementation of a method for assigning cluster groups of conversations to a lesser number of distinct semantic groups at task 510 and is not intended to be limiting. For example, machine learning or other artificial intelligence techniques may be applied to the representative utterances of a cluster group (or the numerical vector representation thereof) to identify the semantic group to be assigned to that cluster group (and the conversations assigned thereto) before storing or otherwise maintaining the semantic group classification output by the resulting model as structural metadata associated with the respective conversations assigned to that cluster group. In yet other implementations, the different semantic groups may be configured or otherwise defined by a user. For example, a CRM leader or other user may manually define the potential contact reasons, topics or other high level semantic groups conversations are to be grouped into. In such implementations, the user-defined semantic group names or titles may be converted into numerical vector representations, which are then utilized to map cluster groups to different ones of the predefined semantic groups based on the semantic similarity between the numerical vector representation of the respective cluster group representative utterances and the respective semantic group numerical vector representations (e.g., by assigning a cluster group to the semantic group where the difference between numerical vector representations is minimized). Similarly, a CRM leader or other user may manually define the different top level cluster groups within the different predefined contact reasons, with the conversation clustering process 700 being utilized to cluster conversations into lower level (or more granular) cluster groups, which, in turn, are clustered into respective ones of the top level cluster groups based on the semantic similarity between the numerical vector representations. In this regard, it will be appreciated there a numerous potential different implementations that utilize user-defined or user-configurable semantic groups and/or cluster groups in concert with automatically identified semantic groups and/or cluster groups, and the subject matter is not limited to any particular implementation.

Referring again to FIG. 5, after assigning cluster groups to different semantic groups, in exemplary implementations, the conversation mapping process 500 automatically generates and assign names to the different semantic groups based on the semantic content of the respective semantic group (task 512) in a similar manner as described above in the context of the cluster groups (e.g., task 508). For example, for a given semantic group, an automated naming process may be performed to extract potential candidate names for the semantic group from the respective reference representative utterances or other semantic representations (e.g., the cluster group names) of the different cluster groups assigned to the semantic group, for example, by extracting associated noun and verb pairs from the respective reference representative utterances of each contact reason cluster group assigned to a topic group. After extracting potential semantic group candidate names from the semantic representations of the assigned cluster groups, the automated naming process may similarly determine an aggregated TF-IDF score or similar relevance score for each of the potential semantic group candidate names based on the relative frequency or usage of the respective words of the respective semantic group candidate name (e.g., by adding the TF-IDF scores for the individual words), and select or otherwise identify the potential semantic group candidate name having the highest score as the preferred semantic group name for the semantic group.

In some implementations, the automated naming process may determine whether or not the preferred autogenerated semantic group name is substantially similar to a predefined semantic group name. For example, an administrator may define a set of potential topic group names that are common or standard across different industries or organizations, such as, for example, "order management," "account issues," and/or the like. Different contact reason cluster groups, such as "cancel order," "check order status," "return order" and/or the like may be assigned to a common topic group that results in a preferred autogenerated semantic group name that is substantially similar to the predefined "order management" topic group name (e.g., by encoded numerical representations having a cosine similarity greater than a threshold, keyword matching, and/or the like). After assigning a name to a semantic group, the conversation mapping process 500 may automatically update a semantic group identifier field of structural metadata for a data record to include the semantic group name, thereby establishing an association between the data record, its assigned cluster group of semantically similar records, and its assigned semantic group that contains its assigned cluster group. For example, the "order management" value may be assigned to the topic group identifier field of structural metadata for the conversation data records assigned to the "cancel order" cluster group, thereby establishing an association between the conversation data records assigned to the "cancel order" cluster group and the hierarchical "order management" topic group that contains the "cancel order" cluster group along with semantically similar cluster groups (e.g., "check order status," "return order," etc.).

Referring again to FIG. 5, by virtue of the conversation mapping process 500, each discrete conversation for which a transcript or corresponding conversational data exists may be assigned or otherwise associated with structural metadata identifying a representative utterance for the conversation, one or more cluster groups of semantically similar conversations and a top level semantic group associated with the respective conversation, thereby providing a tiered hierarchical structure for organizing conversations using the semantic structural metadata that supports analytics, automations and recommendations for what would otherwise be unstructured conversational data. In this regard, the illustrated conversation mapping process 500 calculates or otherwise determines one or more performance metrics associated with each of the different semantic groups (task 514). For example, KPIs or other performance metrics can be calculated across a respective conversation group at the group level based on the constituent conversations that are assigned to the respective semantic group. Depending on the implementation, the performance metrics may include aggregate metrics for the semantic group (e.g., a total number of conversations assigned to the semantic group), statistical metrics summarizing conversations within the semantic group (e.g., an average net promoter score (NPS) per conversation) and/or trend statistics characterizing changes in the rate or frequency of conversations within the semantic group with respect to time. In a similar manner, KPIs or other performance metrics can be calculated for each cluster group based on the constituent conversations that are assigned to the respective cluster group. In this regard, for each conversation, KPIs or performance metrics can be calculated on an individual basis for that particular conversation (e.g., NPS, conversation duration, number of utterances, and/or the like), with the conversation-specific KPIs or performance metrics being aggregated or otherwise combined with other conversation-specific KPIs or performance metrics for other conversations assigned to a common cluster group and/or semantic group. Thus, for each tier of conversations, different KPIs or performance metrics can be determined that summarize or otherwise characterize the conversations assigned to that particular tier and/or changes in the rate or frequency of conversations assigned to that particular tier with respect to time.

For example, in one or more implementations, KPIs or other performance metrics can be calculated at the group level across a respective cluster group of conversations based on the values of different data fields associated with the respective conversation database records. For example, for each conversation within a given contact reason cluster group, the timestamps or other temporal information for the conversation entries associated with that conversation may be analyzed or otherwise utilized to calculate a conversation duration metric (e.g., the duration of time between the start and end of the conversation, the number of utterances within the conversation, and/or the like). The values for the conversation duration metric associated with each conversation within the same contact reason cluster group may be averaged or otherwise combined to arrive at an average or aggregated value for a representative conversation duration metric to be associated with the contact reason cluster group. At the semantic group level, the values for the representative conversation duration metric associated with the respective contact reason cluster groups assigned to the same topic group may be similarly averaged or otherwise combined to arrive at an average or aggregated value for a representative conversation duration metric to be associated with that topic group. Thus, an administrator user interested in providing automations to reduce the conversation duration may analyze the different values for the representative conversation duration metric associated with different topic groups to identify which topic group requires attention, and then within that topic group, analyze the different values for the representative conversation duration metric associated with different contact reason groups to identify which contact reason group requires attention, and then within that contact reason group, identify which representative utterances or conversations are most responsible or influential with respect to the value of the representative conversation duration metric for that particular contact reason group and create corresponding automations for those representative utterances or conversations.

Similarly, KPIs or other performance metrics can be calculated at the group level across a respective cluster group of conversations based on the values of different data fields of other related database records associated with the respective conversation records assigned to a particular cluster group or semantic group. For example, the values for the status field (e.g., new, closed, escalated, etc.) of data records corresponding to the case database object type that are associated with different conversation data records assigned to a common cluster group may be utilized to determine corresponding statistics that represent the case status performance or relative distribution of case statuses for the conversations assigned to that cluster group (e.g., the percentage of conversations associated with a particular contact reason that resulted in closing a case, the percentage of conversations associated with a particular contact reason that resulted in escalating a case, etc.). At the semantic group level, the different respective values for the representative related case status performance metric associated with the different respective contact reason cluster groups assigned to the same topic group may be similarly averaged or otherwise combined to arrive at an average or aggregated value for a representative related case status performance metric to be associated with that topic group. Thus, an administrator user interested providing conversation-related automations to improve case resolution or performance may analyze the different values for the representative related case performance metric associated with different topic groups to identify which topic group requires attention, and then within that topic group, analyze the different values for the representative related case performance metric associated with different contact reason groups to identify which contact reason group requires attention, and then within that contact reason group, identify which representative utterances or conversations are most responsible or influential with respect to the case performance to create corresponding automations for those representative utterances or conversations.

Still referring to FIG. 5, the conversation mapping process 500 generates or otherwise provides graphical indicia of the different semantic groups the historical conversations were classified into along with corresponding indicia of the associated performance metrics (task 516). In some implementations, the conversation mapping process 500 may generate or otherwise provide a semantic group summary GUI display that includes graphical indicia of the different semantic groups, where the graphical indicia are influenced by one or more performance metrics or KPIs associated with the respective semantic groups. For example, a graphical representation of a respective semantic group may be rendered using a size, color, shape, or other visually distinguishable characteristic that is correlative to or otherwise indicative of the performance metric(s) and/or KPI(s) associated with the respective semantic group. In this manner, the graphical indication of a respective semantic group may concurrently convey the relative significance or impact of the respective semantic group relative to the graphical indicia for the other semantic groups, thereby allowing a user to quickly and visually identify key driver semantic groups. In exemplary implementations, the semantic group summary GUI display is interactive and allows a user to drill down into individual semantic groups, individual cluster groups contained therein and/or individual conversations contained within a particular cluster group. In this regard, as the user navigates through a sequence of GUI displays, graphical indicia of KPIs or other performance metrics associated with the respective conversation tier are depicted on the GUI display.

In exemplary implementations, the conversation mapping process 500 also generates or otherwise provides one or more GUI elements for initiating one or more automated actions using structural conversation metadata (task 518). In this manner, one or more automated actions may be created or otherwise defined in association with a particular semantic group, cluster group, representative utterance and/or speaker(s) and subsequently performed or applied in real-time with respect to subsequent conversations that are mapped to that same semantic group, cluster group, representative utterance and/or speaker(s). For example, the GUI elements may allow the user to activate or otherwise initiate a wizard or similar feature that includes one or more GUI displays that guide the user through creating a particular automation to be applied when a subsequent conversation is detected that matches or otherwise corresponds to a particular semantic group, cluster group, representative utterance and/or speaker(s) associated with the automation. In this regard, a user may drill down into different semantic groups and/or cluster groups and utilize the depicted KPIs or other performance metrics to identify which particular utterances or conversation clusters can be improved using automation (e.g., to reduce conversation duration, improve NPS, etc.).

For example, in one or more implementations, the automated action may include a recommended reply to a particular representative utterance for a conversation with a live agent, an automated reply to a particular representative utterance for a conversation with a chat bot, or the like. In this regard, the server system 306 may perform the steps of identifying a representative utterance associated with a current conversation (e.g., task 504) and assigning the current conversation to a cluster group and/or a semantic group (e.g., tasks 506, 510) in real-time to detect when the structural metadata associated with the current conversation matches one or more triggering criteria for the automated action. When the current conversation is assigned a representative utterance by a customer, client or other end user that matches or is within a threshold similarity to the representative utterance assigned with an automated action (e.g., based on cosine similarity between encoded numerical representations), the server system 306 may automatically initiate the automated action, for example, by providing a graphical representation of a recommended agent response utterance that includes the recommended reply to a live agent at the computer system 304 or configuring the chat bot at the computer system 304 to automatically generate an utterance that includes the automated reply, and/or the like. In this manner, the semantic content of the utterance provided by a live human agent or chat bot in response to the customer utterance includes or otherwise reflects the recommended reply that is designed, configured or otherwise intended to improve performance or KPIs with respect to the current conversation (e.g., by reducing the conversation duration, improving the likelihood of resolution of a related case, and/or the like).

Figure 9:
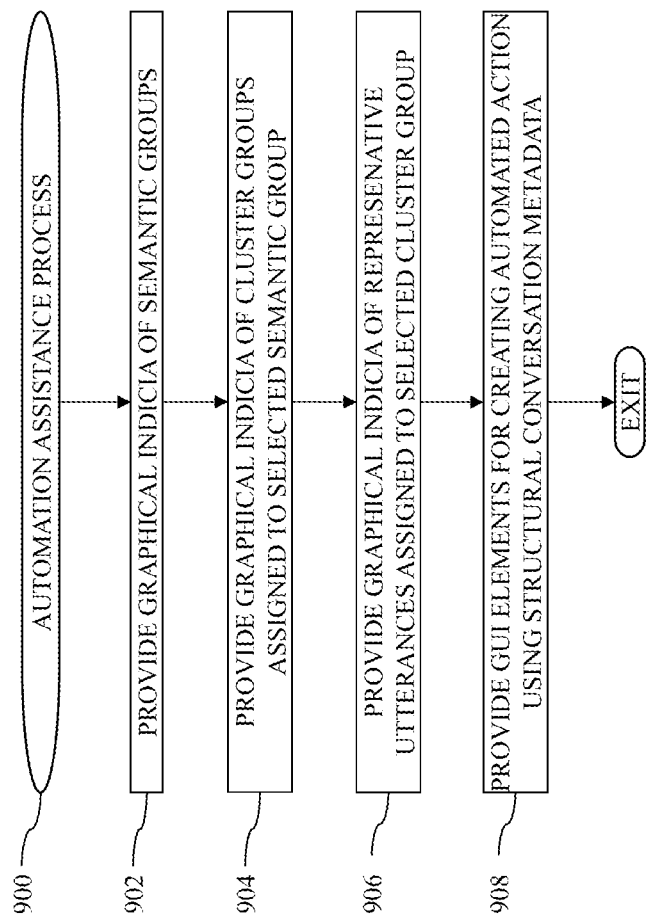
FIG. 9 is a flow diagram illustrating an automation assistance process suitable for use with a computing system in concert with the conversation mapping process of FIG. 5 according to some exemplary implementations.

FIG. 9 depicts an exemplary automation assistance process 900 that may be implemented or otherwise performed by a computing system to create automations using structural conversation metadata derived from the conversation mapping process 500 and perform additional tasks, functions, and/or operations described herein. In one or more implementations, the automation assistance process 900 is implemented or otherwise performed by an automation assistance service associated with an application platform (e.g., application platform 410) supported by an application server (e.g., server 402) associated with a database system (e.g., multi-tenant database system 400). For illustrative purposes, the following description may refer to elements mentioned above in connection with FIGS. 1-4. It should be appreciated that the automation assistance process 900 may include any number of additional or alternative tasks, the tasks need not be performed in the illustrated order and/or the tasks may be performed concurrently, and/or the automation assistance process 900 may be incorporated into a more comprehensive procedure or process having additional functionality not described in detail herein. Moreover, one or more of the tasks shown and described in the context of FIG. 9 could be omitted from a practical implementation of the automation assistance process 900 as long as the intended overall functionality remains intact.

Figure 10:
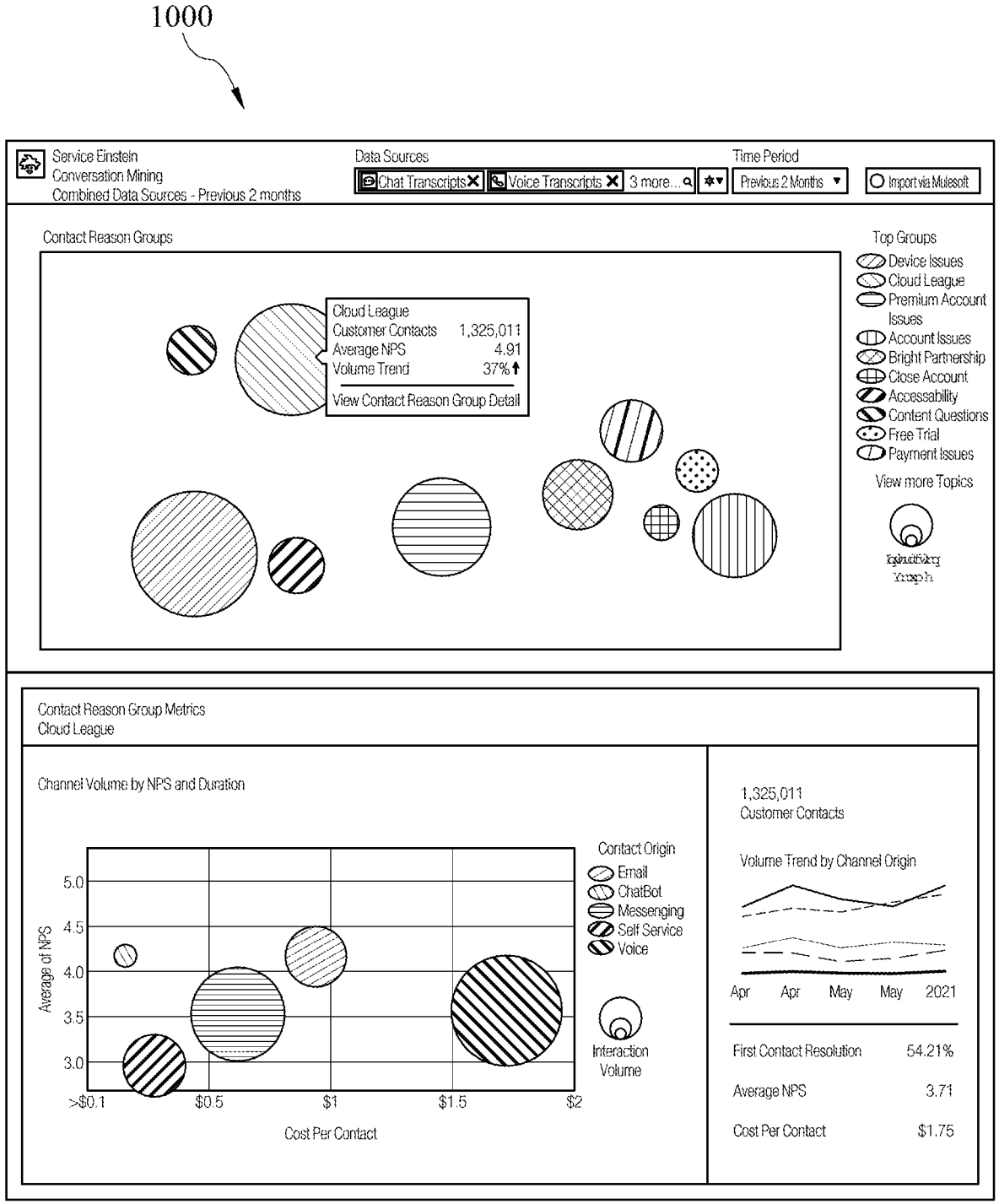

The illustrated automation assistance process 900 begins by displaying, generating or otherwise providing graphical indicia of the different semantic groups encompassing a set of historical conversations (task 902). For example, FIG. 10 depicts an exemplary semantic group summary GUI display 1000 that includes graphical indicia of different contact reason semantic groups (or topics) and their assigned names (e.g., "Device Issues," "Cloud League," "Premium Account Issues," etc.) identified from historical conversations, where the graphical indication of each contact reason topic group is realized as a circle rendered with a size that corresponds to the number of conversations (or customer contacts) associated with the respective contact reason topic group. When the Cloud League topic group is selected, the semantic group summary GUI display 1000 includes graphical indicia of the KPIs or performance metrics associated with the Cloud League topic group, such as, for example, the total number of conversations, the average NPS derived from the conversations assigned to the Cloud League topic group, the percentage change in the frequency of conversations associated with the Cloud League topic group, the average cost per contact for conversations associated with the Cloud League topic group, the resolution percentage for conversations associated with the Cloud League topic group, and the distribution of conversations associated with the Cloud League topic group by communication channel (e.g., e-mail, chat bot, text messaging, voice or phone, self-service, etc.).

Figure 11:
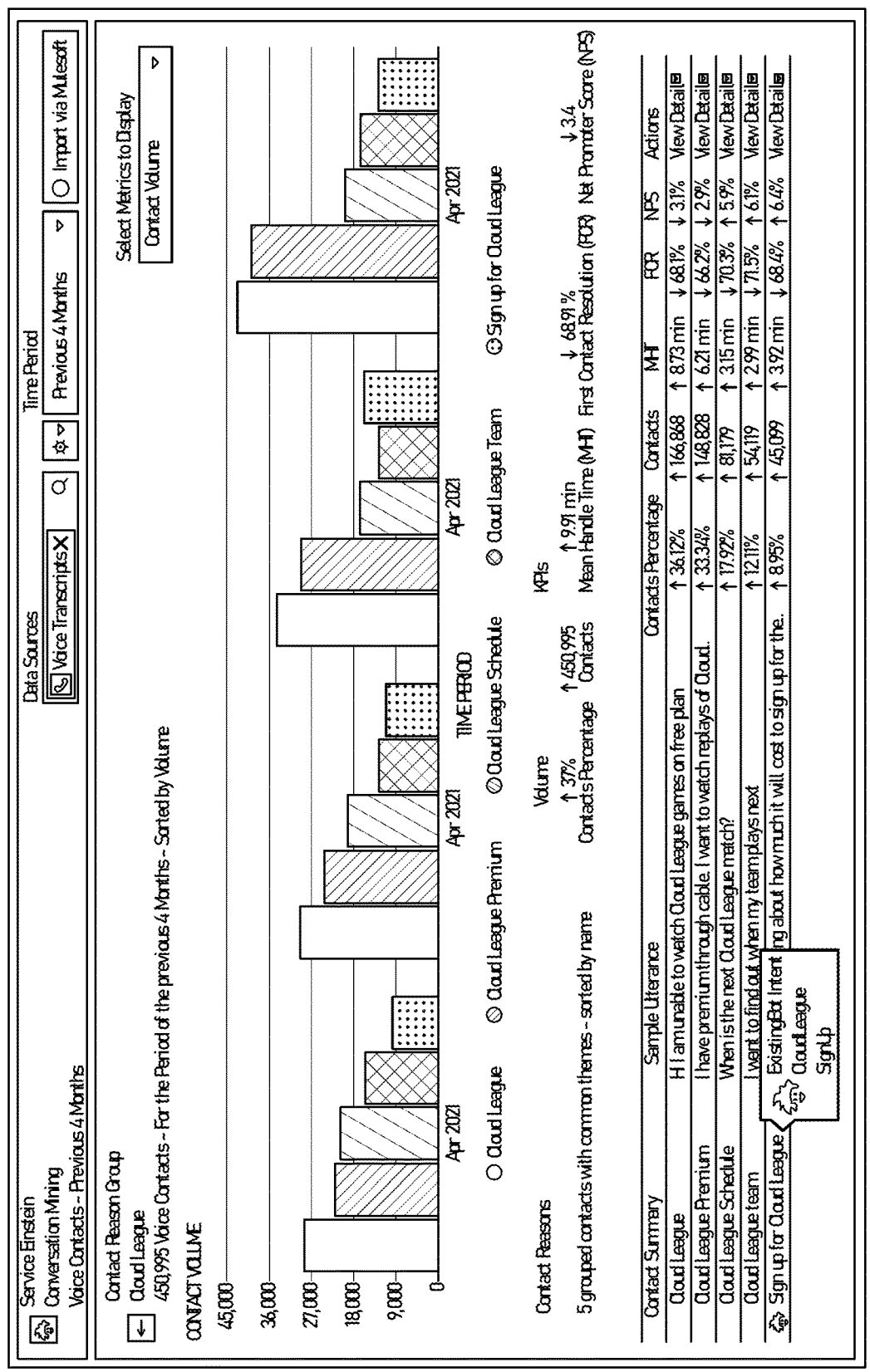

Referring again to FIG. 9, the illustrated automation assistance process 900 continues by displaying, generating or otherwise providing graphical indicia of the different cluster groups of conversations assigned to a selected semantic group (task 904). For example, FIG. 11 depicts an exemplary semantic group analysis GUI display 1100 that may be displayed, generated, rendered or otherwise presented in response to user selection of the Cloud League topic (or a GUI element associated therewith) on the semantic group summary GUI display 1000 to drill down into the conversations assigned to the Cloud League topic. The semantic group analysis GUI display 1100 includes graphical indicia of the contact reason cluster groups assigned to the Cloud League topic group and the corresponding names assigned to the contact reason cluster groups (e.g., "Cloud League," "Cloud League Premium," "Cloud League Schedule," etc.). In this regard, FIG. 11 depicts an example where the selected semantic group encompasses 5 contact reason cluster groups assigned there to. The semantic group analysis GUI display 1100 includes graphical indicia of the aggregate KPIs or performance metrics associated with the Cloud League topic group across all of its assigned contact reason cluster groups, along with the KPIs or performance metrics associated with the individual contact reason cluster groups, such as, for example, the number of conversations associated with the contact reason cluster group (e.g., "Contacts"), the percentage change in the number of conversations associated with the contact reason cluster group over a preceding period of time (e.g., "Contacts Percentage"), the first contact case resolution percentage associated with the contact reason cluster group (e.g., "First Contact Resolution (FCR)"), the average NPS associated with the contact reason cluster group, the average conversation duration associated with conversations associated with the contact reason cluster group, and/or the like. As shown, the semantic group analysis GUI display 1100 may include drop-down menus or other GUI elements that are manipulable by a user to change the type and/or presentation of KPIs or performance metrics displayed on the semantic group analysis GUI display 1100. For example, the names assigned to the contact reason cluster groups may be rendered, generated or otherwise provided as hyperlinks that are selectable by a user to drill down into the selected contact reason cluster group.

Figure 12:
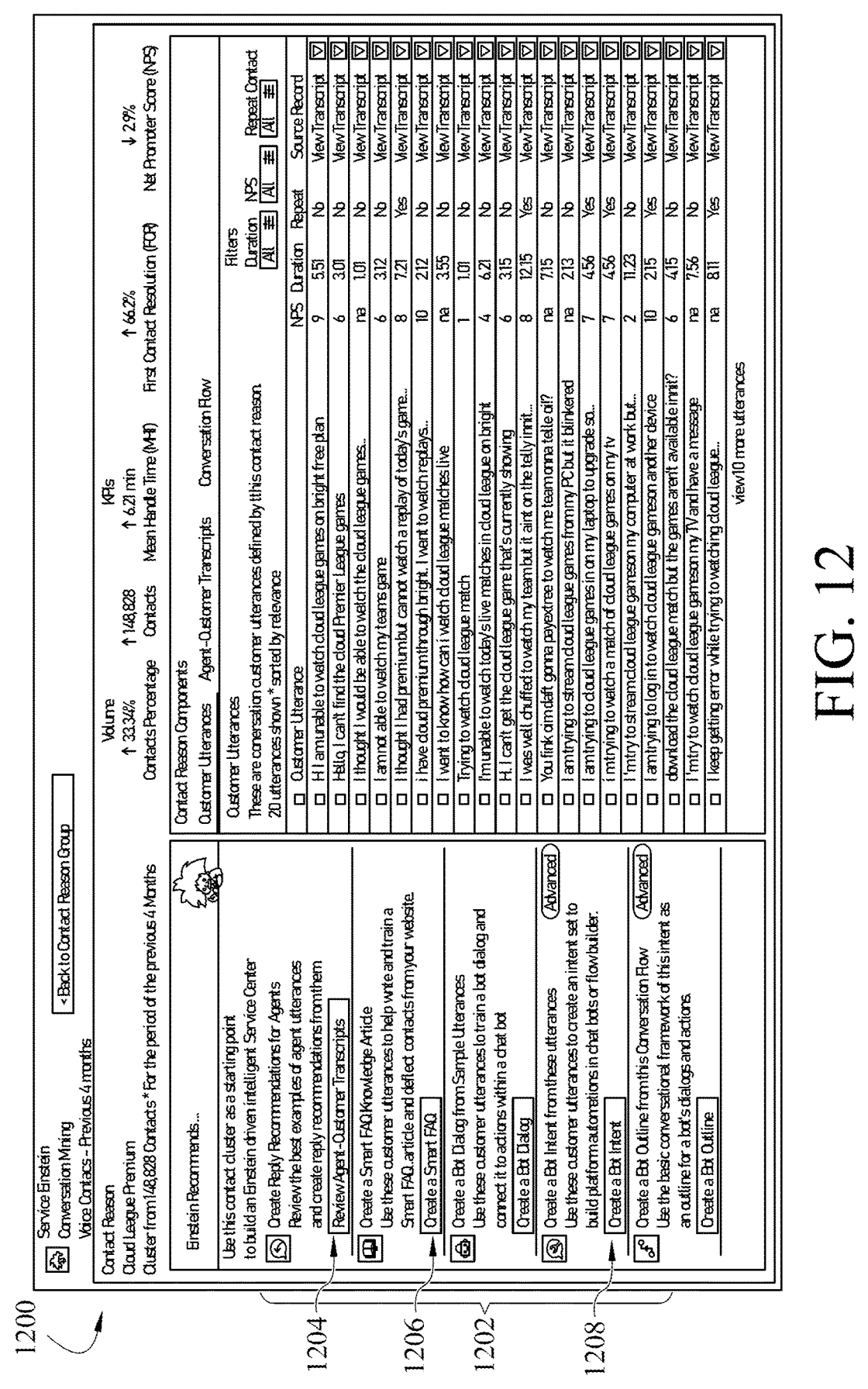
Figure 13:
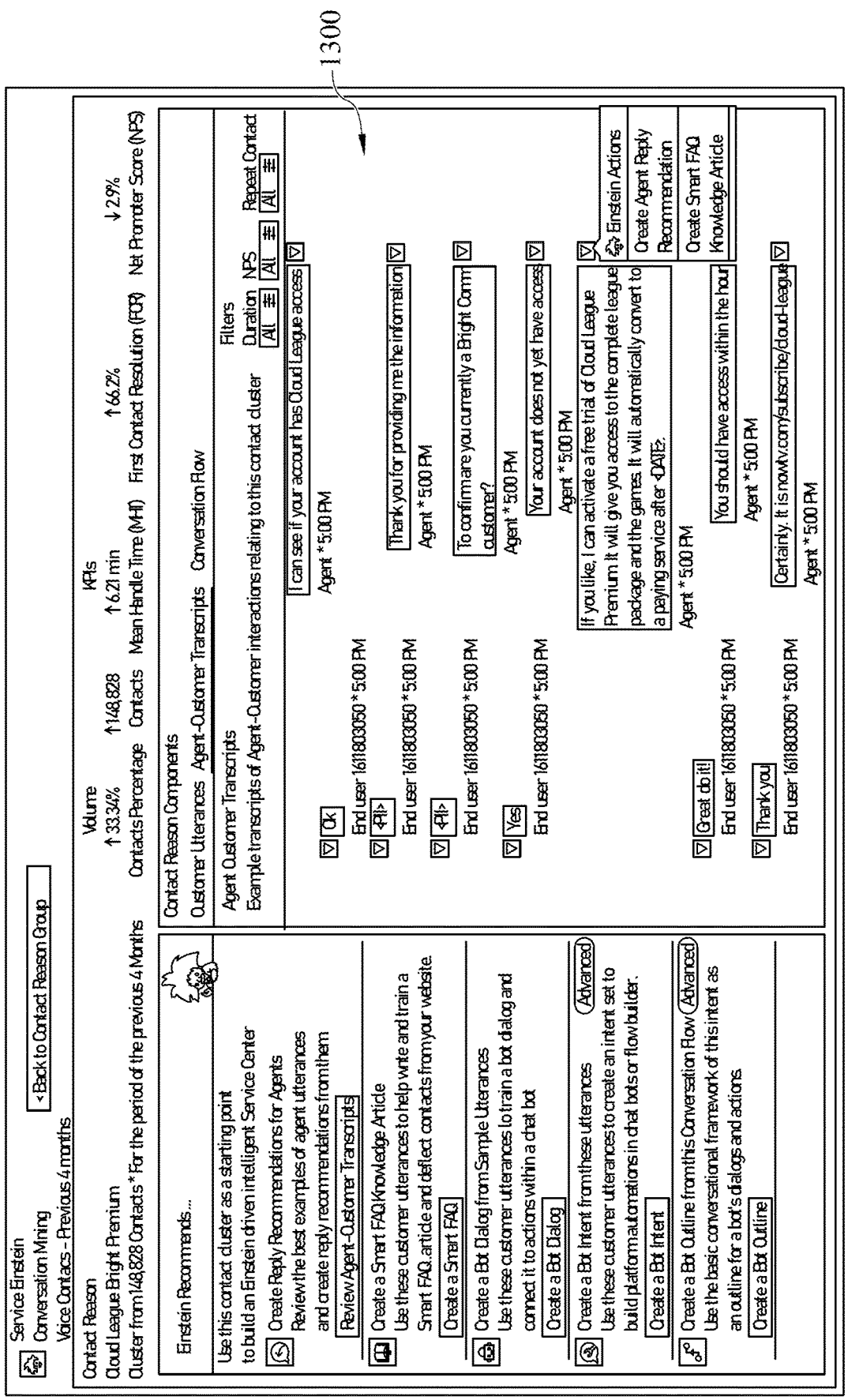

Referring again to FIG. 9, the illustrated automation assistance process 900 continues by displaying, generating or otherwise providing graphical indicia of the different representative utterances for the subset of conversations assigned to a selected cluster group (task 906). For example, FIG. 12 depicts an exemplary cluster group analysis GUI display 1200 that may be displayed, generated, rendered or otherwise presented in response to user selection of the Cloud League Premium contact reason cluster group on the semantic group analysis GUI display 1100 to drill down into the conversations assigned to the Cloud League Premium contact reason cluster group underneath the Cloud League contact reason topic group, for example, because the Cloud League Premium contact reason cluster group has the lowest average NPS among contact reason cluster groups assigned to the Cloud League topic. The cluster group analysis GUI display 1200 includes graphical indicia of the KPIs or performance metrics associated with the Cloud League Premium contact reason cluster group (e.g., the contacts percentage, contacts, mean handle time, first contact resolution and net promoter score across the Cloud League Premium contact reason cluster group). The cluster group analysis GUI display 1200 also includes a listing of the representative utterances associated with the constituent conversations assigned to the Cloud League Premium contact reason cluster group along with graphical indicia of the KPIs or performance metrics associated with the respective conversations (e.g., the NPS associated with the conversation, the duration of the conversation, etc.). The listing of the representative utterances may also include graphical indicia of other characteristics associated with the respective conversation, such as, for example, whether or not the conversation is a repeat contact, the communication channel associated with the conversation (e.g., e-mail, text messaging, voice or phone, etc.), the type of speaker(s) associated with the conversation (e.g., live agent or chat bot or both) and/or the like. Additionally, the entry including the representative utterance and KPIs associated with a respective conversation may also include a hyperlink or similar GUI element that is selectable by a user to view a GUI display 1300 including a transcript of the selected conversation, as shown in FIG. 13, thereby allowing a user to drill down into the particular conversation associated with a representative utterance of interest.

Referring again to FIG. 9, the illustrated automation assistance process 900 also displays, generates or otherwise provides one or more GUI elements that are manipulable by a user to create an automated action using structural conversation data (task 908). For example, as depicted in FIG. 12, the cluster group analysis GUI display 1200 may include a sidebar menu 1202 that includes selectable GUI elements 1204, 1206, 1208 corresponding to different automations that may be recommended for consideration and/or implementation with respect to the selected cluster group or a representative utterance contained therein, such as, for example, creation of a reply recommendation for live agents, creation of a bot dialog for a chat bot automatically responding to a particular utterance, creating a bot intent for training a chat bot or initiating an automated response by a chat bot, creating an outline or conversational framework for a bot dialog, or creating a knowledge article to be provided in response to a particular utterance. In this regard, a user may analyze the different representative utterances and conversations driving KPIs or other performance metrics capable of being improved using automation (e.g., to increase NPS, reduce contact duration, reduce contact frequency or repeat contacts, and/or the like). For example, the user may review transcripts of different conversations to identify utterances by agents that were able to achieve resolution more quickly, with higher NPS, and/or the like and utilize those utterances to construct automated responses for subsequent conversations.

Referring to FIG. 1, in one or more implementations, the prediction system 101 and/or the prediction module 103 may be configured to predict a likely field value for one or more fields associated with a conversation based on the structural metadata assigned to the conversation during the conversation mapping process 500. For example, in one implementation, the prediction system 101 and/or the prediction module 103 predict a value for a semantic group field (e.g., the semantic group to be assigned to the conversation) based on the representative utterance and/or the cluster group(s) assigned to the respective conversation (or numerical vector representations thereof). That said, in other implementations, the prediction system 101 and/or the prediction module 103 can predict values for any number of different fields of structural metadata associated with a conversation using the representative utterance, the cluster group(s) and/or the semantic group assigned to the respective conversation (or numerical vector representations thereof). For example, in one implementation, the values for (or the numerical vector representations of) the structured metadata fields derived from the conversation mapping process 500 (e.g., the representative utterance, the cluster group and/or the semantic group) may be input or otherwise provided to one or more of an encoder model, a classification model, an aggregation model, a summarization model and/or another prediction model to automatically generate a recommended value for a structured field of a database object, such as a summary field, a status field, or another field summarizing activity during a lifecycle of a case database object, as a function of the structured metadata fields derived from the conversation mapping process 500 and the unstructured conversational data associated with that database object (e.g., one or more of chat messaging data, a feed and/or an e-mail thread, etc.), as described in greater detail in U.S. patent application Ser. No. 15/929,364, which is incorporated by reference herein in its entirety.

Figure 14:
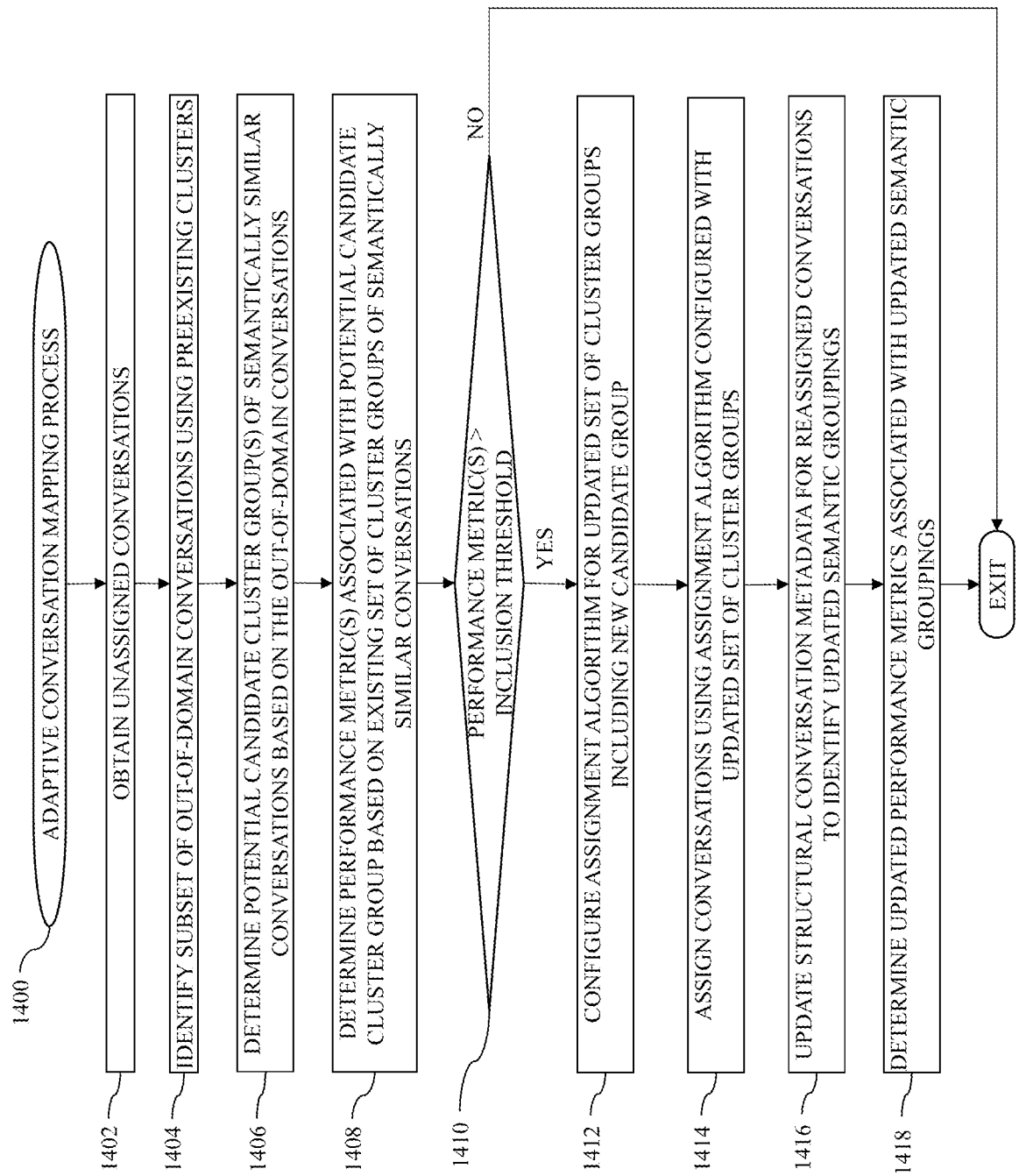
FIG. 14 is a flow diagram illustrating an adaptive conversation mapping process suitable for use with a computing system according to some exemplary implementations.

Referring now to FIG. 14, with continued reference to FIGS. 5-13, in practice, after an iteration of conversation mapping process 500 generates a conversation analysis report (e.g., one of the GUI displays 1000, 1100, 1200, 1300), additional conversations between different users and agents may occur that would not otherwise be reflected by a previously generated report. Accordingly, it is desirable to assign structural metadata to the new (or more recently received) unassigned conversations and update performance metrics and corresponding conversation analysis reports to reflect the more recent conversation data. However, the semantic content of the more recent and unassigned conversations may drift or vary over time, such that the prior semantic groupings of conversations no longer represent the optimal semantic groupings of conversations. Accordingly, exemplary implementations described herein support an adaptive conversation mapping process 1400 implemented or otherwise performed by a conversation mining service associated with an application platform (e.g., application platform 410) supported by an application server (e.g., server 402) to adaptively update the semantic groupings of conversations to reflect changes in the semantic content exhibited by more recent or newer conversations occurring after a preceding iteration of the conversation mapping process 500. In this regard, the adaptive conversation mapping process 1400 may be periodically performed (e.g., daily, weekly, monthly and/or the like) or initiated in response to some other triggering event (e.g., receiving at least a threshold number of new conversations since a preceding iteration of a conversation mapping process 500, 1400).

As described in greater detail below, the adaptive conversation mapping process 1400 analyzes the respective representative utterances associated with unassigned conversations to automatically discover potential new groups of semantically similar conversations for consideration to be added to an updated conversation analysis report. In this regard, the representative utterances associated with the unassigned conversations are analyzed to cluster or otherwise group the unassigned conversations into one or more different candidate cluster groups for potential inclusion in an update to the conversation analysis report. For each potential candidate cluster group, a corresponding reference semantic representation for the candidate cluster group is determined based on the representative utterances associated with the respective conversations that are grouped or otherwise mapped to that potential cluster group in a similar manner as described above (e.g., task 802). After identifying a potential candidate cluster group and its corresponding semantic representation, the potential candidate cluster group is analyzed in relation to the existing cluster groups to determine one or more clustering performance metrics associated with the potential candidate cluster group, for example, based on the relationship between the semantic representation of the potential candidate cluster group and the respective semantic representations of the existing cluster groups. For example, an initial silhouette score for the existing cluster groups may be calculated or otherwise determined for the set of existing cluster groups based on the intracluster distances between pairs of representative utterances in a respective existing cluster group and the intercluster distances between a respective representative utterance in that respective existing cluster group and another representative utterance in a neighboring cluster group (e.g., using the numerical vector representations of the reference representative utterances for the existing contact reason cluster groups). In a similar manner, an updated silhouette score for a potential combination of the candidate cluster group with the existing cluster groups may be calculated or otherwise determined for the potential combination based on the distances between the numerical vector representations of the representative utterances for the new or unassigned conversations assigned to the candidate cluster group in relation to the numerical vector representations of the representative utterances for the existing contact reason cluster groups. In this regard, when the updated silhouette score for the potential combination of the candidate cluster group with the existing cluster groups is positive, the new candidate cluster group contributes positively to the overall clustering quality by virtue of the representative utterances (or conversations) assigned to the new candidate cluster group being closer to one another, on average, rather than the nearest existing cluster group.

When the updated silhouette score is greater than an inclusion threshold (e.g., greater than zero, greater than the initial silhouette score, etc.), and/or the difference between the updated silhouette score is greater than the initial silhouette score is greater than a threshold for inclusion, the adaptive conversation mapping process 1400 determines the candidate cluster group improves the distance or differentiation between cluster groups and should be added or otherwise included in the set of cluster groups to be associated with the conversation analysis report. On the other hand, when the updated silhouette score is less than the inclusion threshold or is otherwise less than the initial silhouette score, the adaptive conversation mapping process 1400 determines the candidate cluster group does not improve the distance or differentiation between cluster groups or otherwise reduces the quality of clustering, and therefore, should be discarded. In this manner, the adaptive conversation mapping process 1400 analyzes the potential candidate cluster groups derived from the unassigned conversations to preferentially select or otherwise identify the potential candidate cluster groups that are likely to improve the quality of clustering while discarding any other potential candidate cluster groups that are unlikely to improve the quality of clustering.

After identifying a potential candidate cluster group derived from unassigned conversations that is likely to improve the clustering quality, the adaptive conversation mapping process 1400 automatically assigns the new or more recent unassigned conversations to a respective one of the cluster groups in the updated set of cluster groups that includes the preexisting autogenerated cluster groups and the newly identified candidate cluster groups selected for inclusion. In this regard, one or more of the unassigned conversations may be automatically assigned to the new candidate cluster group being added to the conversation analysis report based on the relationship between the representative utterance associated with the respective unassigned conversation and the reference semantic representation of the new cluster group, while one or more unassigned conversations could potentially be assigned to one of the preexisting cluster groups based on the relationship between the representative utterance associated with the respective unassigned conversation and the reference semantic representation of the existing cluster group. After assigning the unassigned conversations using the updated set of cluster groups, the adaptive conversation mapping process 1400 automatically updates the conversation records at the database system correspondingly to include metadata identifying the updated candidate group assignments resulting from the assignment algorithm using the updated set of cluster groups. Thereafter, corresponding performance metrics or other KPIs associated with the different cluster groups may be calculated or otherwise determined to facilitate updating the conversation analysis reports (e.g., one of the GUI displays 1000, 1100, 1200, 1300) to reflect the new candidate cluster groups that were added, and the corresponding inclusion of additional conversation data that is more recent or was otherwise excluded from the previous conversation analysis report. In this manner, not only does the adaptive conversation mapping process 1400 improve the accuracy or reliability of the conversation analysis reports (e.g., by incorporating additional and more recent conversations that accumulate over time), but also allows the conversation analysis reports to evolve or adapt over time as the semantic content of the underlying conversations changes to drive the creation of new cluster groups and/or semantic groups that better reflect the current state of the conversations.

Still referring to FIG. 14, with continued reference to FIGS. 1-13, the adaptive conversation mapping process 1400 initializes or otherwise begins by identifying or otherwise obtaining a set of unassigned conversations for analysis (task 1402). In this regard, the unassigned conversations may include conversation records corresponding to conversations between users and agents that occurred after a preceding iteration of the conversation mapping process 500 and/or the adaptive conversation mapping process 1400 that lack values for the structural metadata fields associated with the conversation records that would otherwise identify the contact reason cluster group, the contact reason semantic group, or other semantic grouping assigned with the respective conversation. In addition to newer or more recent conversations, the set of unassigned conversations may also include conversations (or conversation records) that preceded the conversation mapping process 500 and/or the adaptive conversation mapping process 1400 but were otherwise not assigned to a particular contact reason cluster group, for example, based on the respective conversation being identified as an out-of-domain (OOD) data point that is not within a threshold distance of any particular cluster.

After identifying an initial set of unassigned conversations, exemplary implementations of the adaptive conversation mapping process 1400 analyzes the set of unassigned conversations to identify a subset of out-of-domain conversations from among the set of unassigned conversations using the existing cluster groups (task 1404). In this regard, the adaptive conversation mapping process 1400 filters or otherwise excludes unassigned conversations that are semantically similar enough to an existing cluster group, resulting in a subset of unassigned conversations that are not within a threshold distance of any existing cluster group. For example, for each unassigned conversation, its associated representative utterance may be analyzed or otherwise compared to the reference semantic representations of the existing contact reason cluster groups to verify whether or not the semantic content of the unassigned conversation is within a classification threshold of one or more existing contact reason clusters such that the conversation could otherwise be assigned to one of the existing contact reason clusters. When an unassigned conversation is not within a classification threshold of one or more existing contact reason clusters, the unassigned conversation may be designated as an out-of-domain conversation for further analysis.

In one or more implementations, a k-nearest neighbors (KNN) algorithm is configured using the numerical vector representations of the existing contact reason cluster groups and utilized to assign a respective unassigned conversation to one of the existing contact reason cluster groups, for example, by inputting the numerical vector representation of the representative utterance associated with the respective unassigned conversation to the configured KNN algorithm. In this regard, each of the existing contact reason cluster groups may be treated as a "known" class, where for a respective unassigned conversation, the KNN algorithm finds the nearest k (e.g., k=5) representative utterances (or conversations) previously assigned to one of the existing cluster groups and returns the majority vote of the classes that the nearest k conversations were assigned to. After assigning the respective unassigned conversation to a particular contact reason cluster group using the KNN algorithm, one or more clustering performance metrics are calculated or otherwise determined for the respective conversation. For example, in one implementation, a silhouette score for the respective conversation is calculated or otherwise determined based on the relationship between the numerical vector representation of the representative utterance of the respective conversation in relation to the numerical vector representations of the representative utterances associated with other conversations assigned to that existing contact reason cluster group and conversations assigned to the nearest existing contact reason cluster group. In this regard, when the silhouette score is less than a threshold (e.g., less than zero), the adaptive conversation mapping process 1400 determines that the respective conversation is out-of-domain or otherwise not classifiable into one of the existing contact reason cluster groups. In another implementation, a KNN consistency metric is calculated or otherwise determined by identifying a subset of nearest neighbor assigned conversations (e.g., based on the distance between the respective numerical vector representations of the respective representative utterances) and analyzing the respective existing contact reason cluster groups assigned to those nearest neighbor assigned conversations. In this regard, when a number or percentage of the nearest neighbor assigned conversations that were assigned to a different one of the existing contact reason cluster groups is greater than a threshold, the adaptive conversation mapping process 1400 determines that the respective conversation is out-of-domain or otherwise not classifiable into one of the preexisting contact reason cluster groups based on the inconsistent classification in relation to the most semantically similar subset of previously assigned conversations.

In another implementation, a GMM is utilized to identify an out-of-domain subset of the unassigned conversations by fitting the GMM to the existing contact reason cluster groups and designating or otherwise configuring one or more components of the GMM to represent an unclustered group of out-of-domain conversations. The numerical vector representations of the representative utterances of the respective unassigned conversations may be input or otherwise provided to the fitted GMM to assign each of the previously unassigned conversations to one of the existing contact reason cluster groups or the unclustered group of out-of-domain conversations. For example, the GMM utilized by the cluster group assignment algorithm that was previously fitted in connection with the conversation clustering process 700 to identify the initial set of existing contact reason cluster groups that were preferentially selected for inclusion (e.g., based on log-likelihood or other goodness-of-fit metrics) may be utilized to assign unassigned conversations to lower quality contact reason cluster groups that were not selected for inclusion, thereby identifying the respective unassigned conversations as out of domain conversations. The resulting subset of out-of-domain unassigned conversations may be selected or otherwise designated as an unclustered group (or subset) of out-of-domain conversations for further analysis. In some implementations, one or more classification thresholds may be utilized to also select or otherwise identify unassigned conversations that are not within a threshold distance of the mean or median representation of the existing contact reason cluster group to which it was assigned for inclusion in the subset of out-of-domain conversations. In this regard, when the fitted GMM indicates an unassigned conversation should be assigned to a particular existing contact reason cluster group but the distance between the numerical vector representation of the respective representative utterance associated with the conversation and the numerical vector representation of the respective existing contact reason cluster group is greater than a threshold, the unassigned conversation may be retained or otherwise included in the subset of out-of-domain conversations.

Still referring to FIG. 14, after identifying a set of out-of-domain unassigned conversations for analysis (which are a subset of the unassigned conversations), the adaptive conversation mapping process 1400 continues by identifying or otherwise determining one or more potential candidate cluster groups of semantically similar conversations from among the set of out-of-domain unassigned conversations (task 1406). In this regard, similar to conversation mapping process 500 (e.g., at task 506), the adaptive conversation mapping process 1400 attempts to cluster or otherwise group the out-of-domain unassigned conversations into different, non-overlapping and distinct cluster groups of semantically similar conversations based on their representative utterances. For example, an unsupervised GMM using a desired number of cluster groups (which were not previously fit) may be applied to the subset of out-of-domain conversations to assign the out-of-domain unassigned conversations to a desired number (e.g., 20) of different candidate cluster groups of out-of-domain unassigned conversations, where each overlapping candidate cluster group includes a unique subset of the initial set of out-of-domain unassigned conversations that was input to the unsupervised GMM or otherwise used to fit the cluster groups identified by the GMM to the set of out-of-domain unassigned conversations. Alternatively, another clustering technique such as density-based spatial clustering of applications with noise (DBSCAN), hierarchical DBSCAN (HDBSCAN), or another suitable clustering technique may be utilized to assign the out-of-domain unassigned conversations to different candidate cluster groups of out-of-domain unassigned conversations (e.g., by identifying clusters of conversations that are closely packed together using tunable parameters to control the density and number of clusters and input conversations that do not belong to any of the fitted clusters).

After identifying potential candidate cluster groups from the set of out-of-domain unassigned conversations, the adaptive conversation mapping process 1400 continues by calculating or otherwise determining one or more clustering performance metrics associated with a respective potential candidate cluster group in relation to the set of existing cluster groups and determining whether or not to add a respective potential candidate cluster group to the set of cluster groups based on the clustering performance metric(s) (tasks 1408, 1410). In this regard, when the clustering performance metric(s) associated with the respective potential candidate contact reason cluster group does not improve the clustering performance, the adaptive conversation mapping process 1400 discards or otherwise excludes that potential candidate contact reason cluster group from inclusion when updating a conversation analysis report. On the other hand, when the clustering performance metric(s) associated with the respective potential candidate contact reason cluster group indicates the potential candidate contact reason cluster group is likely to improve the clustering performances, the adaptive conversation mapping process 1400 adds, includes or otherwise incorporates that potential candidate contact reason cluster group in the set of active contact reason cluster groups when updating the conversation analysis report.

In exemplary implementations, in a similar manner as described above, a semantic representation of a respective candidate contact reason cluster group is identified or otherwise determined based on the unique subset of the out-of-domain unassigned conversations assigned to that respective candidate contact reason cluster group and then utilized to determine whether the respective candidate contact reason cluster group improves the clustering performance in relation to the different existing contact reason cluster groups. For example, for each candidate contact reason cluster group, the numerical vector representations of the representative utterances associated with respective conversations of the unique subset of the out-of-domain unassigned conversations assigned to that respective candidate contact reason cluster group may be analyzed or otherwise combined to determine a corresponding numerical vector representation of the candidate contact reason cluster group, for example, by identifying the numerical vector that best represents the center, median and/or mean of the respective candidate contact reason cluster group and then utilizing the representative utterance associated with that numerical vector as a reference representative utterance that provides a semantic representation of the candidate contact reason cluster group.

Once a cluster group semantic representation corresponding to the candidate contact reason cluster group is identified, the numerical vector representation of the cluster group semantic representation may be analyzed or otherwise compared to the numerical vector representations of the reference semantic representations for the existing contact reason cluster groups to determine whether or not the candidate contact reason cluster group improves the clustering performance. In one or more exemplary implementations, an initial reference silhouette score may be calculated or otherwise determined for the set of existing contact reason cluster groups based on the distances between the numerical vector representations of the representative utterances assigned to the respective contact reason cluster groups. In a similar manner, a potential updated silhouette may be calculated or otherwise determined for the potential updated set of contact reason cluster groups that includes the respective candidate contact reason cluster group in addition to the existing contact reason cluster groups based on the distances between the numerical vector representations of the representative utterances for the unassigned conversations assigned to the respective candidate contact reason cluster group and the respective numerical vector representations of the representative utterances assigned to the respective existing contact reason cluster groups.

In one implementation, when the updated silhouette score is greater than the initial silhouette score, the adaptive conversation mapping process 1400 determines the candidate cluster group improves the overall clustering performance and determines the candidate cluster group should be activated or otherwise added to the updated conversation analysis report. Additionally, or alternatively, in some implementations, the adaptive conversation mapping process 1400 may verify or otherwise confirm that a difference between the updated silhouette score and the initial silhouette score is greater than an inclusion threshold configured to increase the likelihood that the candidate cluster group will improve the overall clustering performance in an appreciable or non-negligible manner. That said, in yet other implementations, the adaptive conversation mapping process 1400 may determine the candidate cluster group should be activated or otherwise added to the updated conversation analysis report when the updated silhouette score is greater than an inclusion threshold (e.g., greater than 0), independent of the initial silhouette score for the preexisting cluster groups. In some implementations, in addition to, or in alternative to using a silhouette score, a KNN consistency metric may be calculated or otherwise determined for the candidate cluster group (e.g., by analyzing a subset of nearest neighbor conversations for the unassigned conversations assigned to the respective candidate cluster group) to verify the relative consistency or rate at which semantically similar conversations would be assigned to that candidate cluster group rather than another preexisting cluster group.

Still referring to FIG. 14, when the adaptive conversation mapping process 1400 determines a candidate cluster group derived from the out-of-domain unassigned conversations should be added to the set of active cluster groups, the adaptive conversation mapping process 1400 updates or otherwise configures the cluster group assignment algorithm to be constrained to using an updated set of cluster groups that includes the preexisting cluster groups along with the candidate cluster group that is being newly added to the conversation analysis report before automatically assigning conversations using the updated assignment algorithm (tasks 1412, 1414). For example, in one or more implementations, when a candidate contact reason cluster group derived from the out-of-domain unassigned conversations improves the contact reason clustering, the adaptive conversation mapping process 1400 updates or otherwise modifies the fitted GMM to assign or otherwise map numerical vector representations to one of the preexisting contact reason cluster groups (e.g., which may have been originally derived from an initial training subset of conversations at task 706 in connection with an initial iteration of the conversation mapping process 500) or the newly-added contact reason cluster group derived from the out-of-domain unassigned conversations. Thereafter, the unassigned conversations associated with a particular user, tenant, organization or other resource owner may be assigned using the updated assignment algorithm, for example, by applying the updated fitted GMM model incorporating the new contact reason cluster group to the numerical vector representations of the representative utterances for the respective conversations in a similar manner as described above in the context of the conversation mapping process 500 of FIG. 5. In this regard, the adaptive conversation mapping process 1400 may result in one or more of the conversations that were previously considered to be out-of-domain being assigned to the new contact reason cluster group derived from what were previously out-of-domain unassigned conversations when the semantic representation of the new contact reason cluster group is more semantically similar to those conversations, thereby allowing the updated conversation analysis report to better reflect the semantics of a greater number of the conversations associated with that particular user, tenant, organization or other resource owner, as well as reflecting more recent conversations that may not have been included in a preceding conversation analysis report.

After assigning conversations using the updated assignment algorithm that incorporates the newly identified cluster group(s) to be added to a conversation analysis report, the adaptive conversation mapping process 1400 automatically updates the structural conversation metadata to identify the updated cluster group and semantic group assignments resulting from the updated assignment algorithm (task 1416). In a similar manner as described above in the context of the conversation mapping process 500, after conversations are clustered and assigned to different contact reason cluster and semantic groups of semantically similar conversations using the updated assignment algorithm configuration, the corresponding record or entry in the database for the respective conversation is updated to include metadata that identifies the updated contact reason cluster and semantic group(s) to which the respective conversation was assigned in lieu of any previous values for those fields of metadata.

After the cluster group and semantic group fields of the conversation records have been updated to reflect the outcome of the updated assignment algorithm, the adaptive conversation mapping process 1400 calculates or otherwise determines updated values for the performance metrics associated with the updated conversation groupings (task 1418) in a similar manner as described above (e.g., at task 514 of the conversation mapping process 500). In this regard, the various values for the KPIs or other performance metrics associated with the different preexisting contact reason cluster groups and contact reason semantic groups are updated to reflect the underlying changes to what conversations are assigned to or otherwise associated with the updated contact reason cluster groups and updated contact reason semantic groups, while also calculating various values for the KPIs or other performance metrics associated with the newly added contact reason cluster group to reflect conversations assigned to the newly added contact reason cluster group (with the performance metrics for the contact reason semantic group to which the newly added contact reason cluster group is assigned being correspondingly updated to account for the newly added contact reason cluster group being added to that contact reason semantic group). Thereafter, when a user interacts with a virtual application to view a semantic group summary GUI display, semantic group analysis GUI display, a cluster group analysis GUI display and/or the like, the graphical indicia of the updated semantic groups and/or updated cluster groups are updated to reflect the updated values for the performance metrics or KPIs associated with the respective semantic groups and/or cluster groups that better reflect the conversations associated with the particular user, tenant, organization or other resource owner that occurred after a prior iteration of the respective conversation analysis GUI display or account for newly assigned conversations that may have been previously excluded on the basis of being considered out-of-domain during a prior iteration of the conversation mapping process 500 and/or the adaptive conversation mapping process 1400.

It should be noted that the adaptive conversation mapping process 1400 may still result in conversations being unassigned by virtue of being out-of-domain (or not within a classification threshold of any cluster group), however, subsequent iterations of the adaptive conversation mapping process 1400 may ultimately derive cluster groups that include those conversations to incorporate those out-of-domain unassigned conversations to a conversation analysis GUI display or report at a subsequent point in time. In this regard, remaining unassigned conversations after a preceding iteration of the adaptive conversation mapping process 1400 may be included in the group of unassigned conversations input to a subsequent iteration of the adaptive conversation mapping process 1400 (e.g., at task 1402), thereby allowing the conversation analysis reports to be iteratively adapted over time. For example, for an implementation utilizing a KNN, the newly identified cluster groups identified during a preceding iteration of the adaptive conversation mapping process 1400 are treated as an existing cluster group or "known" class for a subsequent iteration of the KNN. Alternatively, for an implementation utilizing a GMM, the fitted GMM from the preceding iteration is updated to reflect the newly identified cluster groups identified during that preceding iteration of the adaptive conversation mapping process 1400. For example, a semi-supervised GMM with an additional number of cluster groups may be fit or otherwise configured to include the cluster groups identified during that preceding iteration of the adaptive conversation mapping process 1400 (e.g., by fixing the assignments to existing or known cluster groups) while allowing the assignment of unassigned conversations to be updated, with updated GMM being configured to assign a new unassigned conversation to either one of the known cluster groups or to an out-of-domain (or lower quality) cluster group.

Figure 15:
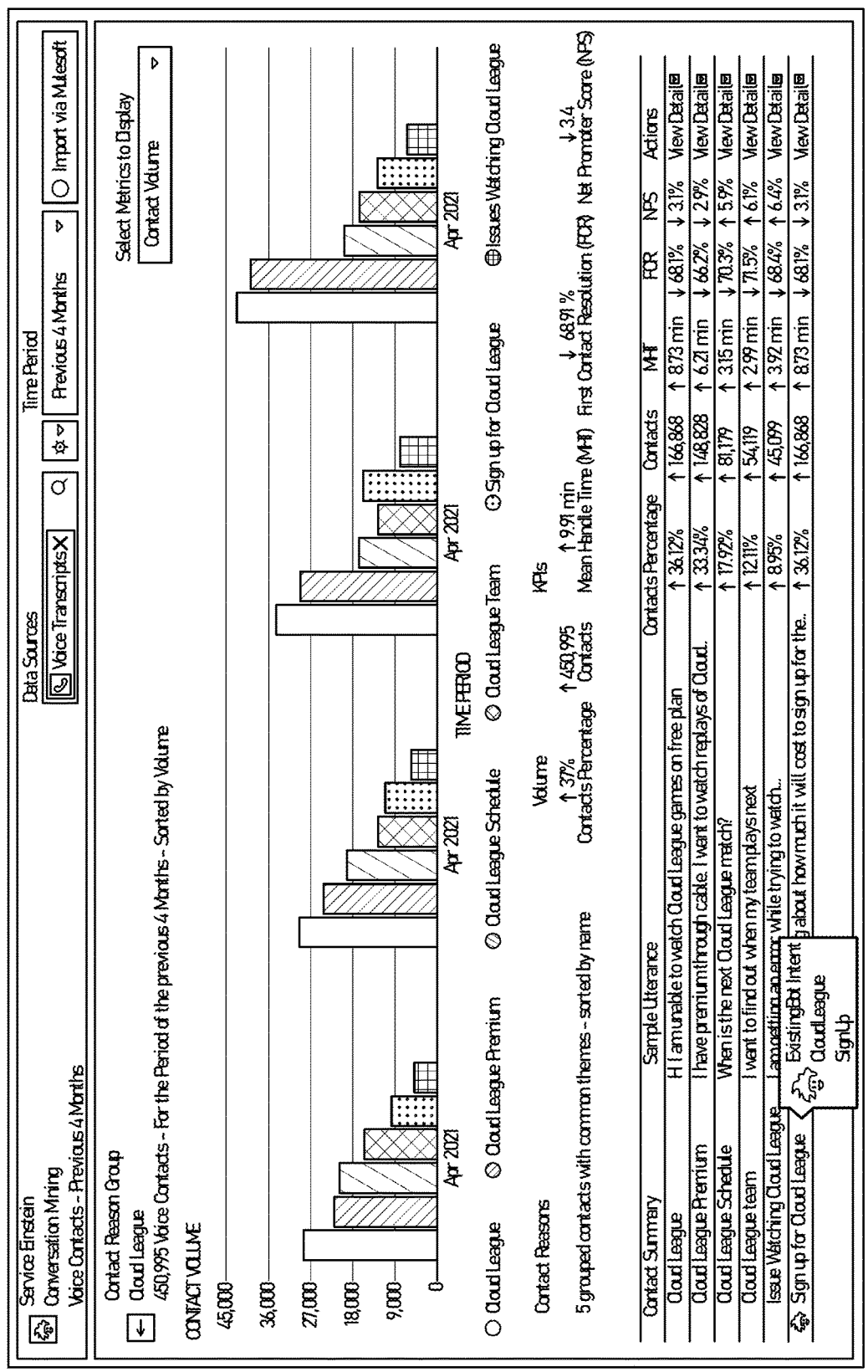
FIG. 15 depicts an exemplary GUI display suitable for presentation by a computing system in connection with the adaptive conversation mapping process of FIG. 14 according to some exemplary implementations

FIG. 15 depicts an exemplary updated semantic group analysis GUI display 1500 that may be displayed, generated, rendered or otherwise presented that may be generated or otherwise provided by a service associated with an application platform (e.g., application platform 410) supported by an application server (e.g., server 402) within a web browser or similar client application 442 at a client device 440 in connection with the adaptive conversation mapping process 1400 of FIG. 14. In this regard, the updated semantic group analysis GUI display 1500 may be presented in lieu of a prior semantic group analysis GUI display 1100 in response to user selection of the Cloud League topic (or a GUI element associated therewith) on the semantic group summary GUI display 1000 to drill down into the conversations assigned to the Cloud League topic after an iteration of the adaptive conversation mapping process 1400 of FIG. 14.

Relative to FIG. 11, the updated semantic group analysis GUI display 1500 includes graphical indicia of a new contact reason cluster group "Issue Watching Cloud League" assigned to the selected Cloud League topic group, where the new contact reason cluster group was identified as a candidate contact reason cluster group (e.g., at task 1406) based on conversations that were previously unassigned and/or were received after a prior iteration of the conversation mapping process 500 of FIG. 5 to generate the initial semantic group analysis GUI display 1100. Similar to the prior semantic group analysis GUI display 1100, the updated semantic group analysis GUI display 1500 includes graphical indicia of the KPIs or performance metrics associated with the newly-identified "Issue Watching Cloud League" contact reason cluster group, such as, for example, the number of conversations associated with the contact reason cluster group, the percentage change in the number of conversations associated with the contact reason cluster group over a preceding period of time, the first contact case resolution percentage associated with the contact reason cluster group, the average NPS associated with the contact reason cluster group, the average conversation duration associated with conversations associated with the contact reason cluster group, and/or the like. The updated semantic group analysis GUI display 1500 may similarly include drop-down menus or other GUI elements that are manipulable by a user to drill down into the newly-identified "Issue Watching Cloud League" contact reason cluster group to review the representative utterances or conversations assigned to that new contact reason cluster group and create or otherwise define automated actions with respect to the new contact reason cluster group in a similar manner as described above in the context of FIGS. 9-12.

Referring to FIGS. 14-15, by virtue of the adaptive conversation mapping process 1400, the mapping of conversations to different groups of semantically similar conversations may adapt to improve the classification and coverage of the conversations associated with the particular user, tenant, organization or other resource owner to correspondingly provide adaptively updated conversation analysis reports that more accurately reflect the semantic content of those conversations over time. Thus, as the semantic content of the underlying conversations drifts or changes over time (e.g., due to new products or services, new product support issues, and/or the like), the conversation analysis reports can be updated to better suit the business objectives in a manner that better reflects the current state of the conversations. This, in turn, can allow a user to identify new or emergent contact reason cluster groups and correspondingly utilize the automation assistance services provided in connection with the conversation mining service to achieve desired business objectives (e.g., by creating a reply recommendation, a bot dialog, a knowledge article or the like pertaining to a contact reason cluster group derived from new or more recent conversations).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 16A:
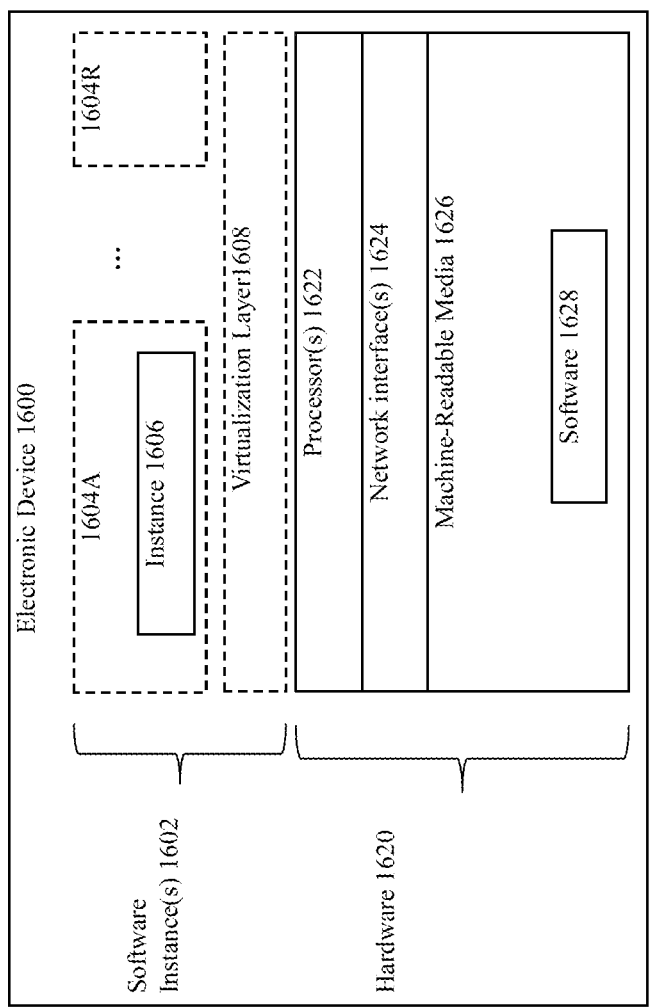
FIG. 16A is a block diagram illustrating an electronic device according to some exemplary implementations.

FIG. 16A is a block diagram illustrating an electronic device 1600 according to some example implementations. FIG. 16A includes hardware 1620 comprising a set of one or more processor(s) 1622, a set of one or more network interfaces 1624 (wireless and/or wired), and machine-readable media 1626 having stored therein software 1628 (which includes instructions executable by the set of one or more processor(s) 1622). The machine-readable media 1626 may include non-transitory and/or transitory machine-readable media. Each of the previously described clients, the conversation mining service (e.g., conversation mapping process 500 and the adaptive conversation mapping process 1400) and the automation assistance service (e.g., automation assistance process 900) may be implemented in one or more electronic devices 1600. In one implementation: 1) each of the clients is implemented in a separate one of the electronic devices 1600 (e.g., in end user devices where the software 1628 represents the software to implement clients to interface directly and/or indirectly with the conversation mining service and/or the automation assistance service (e.g., software 1628 represents a web browser, a native client, a portal, a command-line interface, and/or an application programming interface (API) based upon protocols such as Simple Object Access Protocol (SOAP), Representational State Transfer (REST), etc.)); 2) the conversation mining service and/or the automation assistance service is implemented in a separate set of one or more of the electronic devices 1600 (e.g., a set of one or more server devices where the software 1628 represents the software to implement the conversation mining service and/or the automation assistance service); and 3) in operation, the electronic devices implementing the clients and the conversation mining service and/or the automation assistance service would be communicatively coupled (e.g., by a network) and would establish between them (or through one or more other layers and/or or other services) connections for submitting requests and/or making API calls to the conversation mining service and/or the automation assistance service. Other configurations of electronic devices may be used in other implementations (e.g., an implementation in which the client and the conversation mining service and/or the automation assistance service are implemented on a single one of electronic device 1600).

During operation, an instance of the software 1628 (illustrated as instance 1606 and referred to as a software instance; and in the more specific case of an application, as an application instance) is executed. In electronic devices that use compute virtualization, the set of one or more processor(s) 1622 typically execute software to instantiate a virtualization layer 1608 and one or more software container(s) 1604A-1604R (e.g., with operating system-level virtualization, the virtualization layer 1608 may represent a container engine (such as Docker Engine by Docker, Inc. or rkt in Container Linux by Red Hat, Inc.) running on top of (or integrated into) an operating system, and it allows for the creation of multiple software containers 1604A-1604R (representing separate user space instances and also called virtualization engines, virtual private servers, or jails) that may each be used to execute a set of one or more applications; with full virtualization, the virtualization layer 1608 represents a hypervisor (sometimes referred to as a virtual machine monitor (VMM)) or a hypervisor executing on top of a host operating system, and the software containers 1604A-1604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1628 is executed within the software container 1604A on the virtualization layer 1608. In electronic devices where compute virtualization is not used, the instance 1606 on top of a host operating system is executed on the "bare metal" electronic device 1600. The instantiation of the instance 1606, as well as the virtualization layer 1608 and software containers 1604A-1604R if implemented, are collectively referred to as software instance(s) 1602.

Alternative implementations of an electronic device may have numerous variations from that described above. For example, customized hardware and/or accelerators might also be used in an electronic device.

Figure 16B:
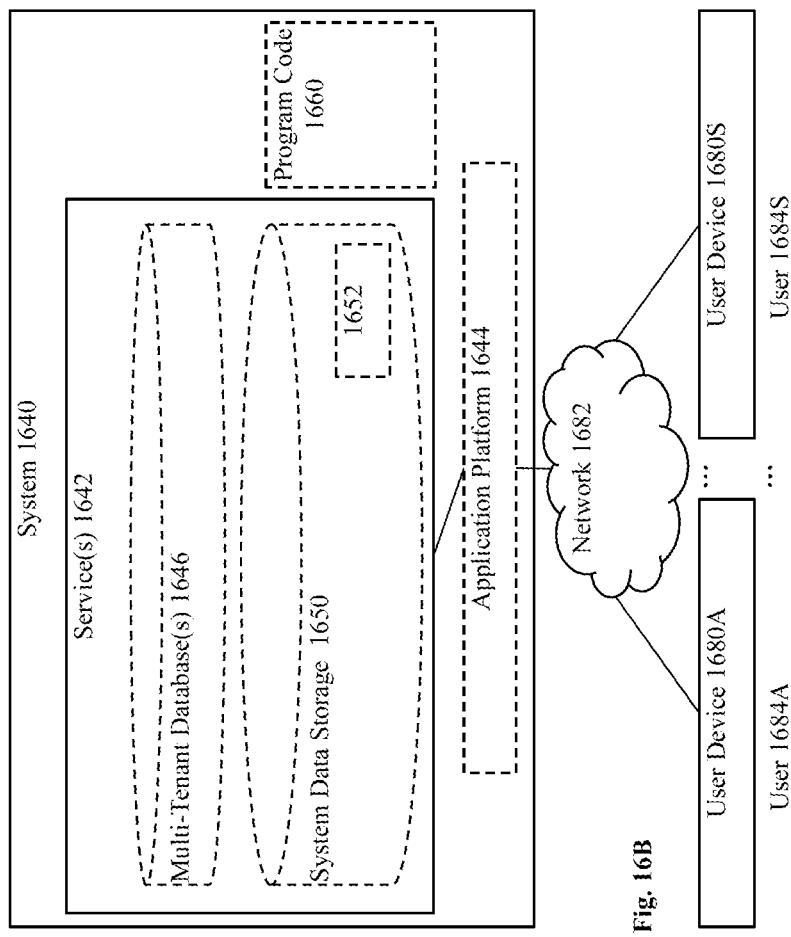
FIG. 16B is a block diagram of a deployment environment according to some exemplary implementations.

FIG. 16B is a block diagram of a deployment environment according to some example implementations. A system 1640 includes hardware (e.g., a set of one or more server devices) and software to provide service(s) 1642, including the conversation mining service and/or the automation assistance service. In some implementations the system 1640 is in one or more datacenter(s). These datacenter(s) may be: 1) first party datacenter(s), which are datacenter(s) owned and/or operated by the same entity that provides and/or operates some or all of the software that provides the service(s) 1642; and/or 2) third-party datacenter(s), which are datacenter(s) owned and/or operated by one or more different entities than the entity that provides the service(s) 1642 (e.g., the different entities may host some or all of the software provided and/or operated by the entity that provides the service(s) 1642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1640 is coupled to user devices 1680A-1680S over a network 1682. The service(s) 1642 may be on-demand services that are made available to one or more of the users 1684A-1684S working for one or more entities other than the entity which owns and/or operates the on-demand services (those users sometimes referred to as outside users) so that those entities need not be concerned with building and/or maintaining a system, but instead may make use of the service(s) 1642 when needed (e.g., when needed by the users 1684A-1684S). The service(s) 1642 may communicate with each other and/or with one or more of the user devices 1680A-1680S via one or more APIs (e.g., a REST API). In some implementations, the user devices 1680A-1680S are operated by users 1684A-1684S, and each may be operated as a client device and/or a server device. In some implementations, one or more of the user devices 1680A-1680S are separate ones of the electronic device 1600 or include one or more features of the electronic device 1600.

In some implementations, the system 1640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1640 may include an application platform 1644 that enables PAAS for creating, managing, and executing one or more applications developed by the provider of the application platform 1644, users accessing the system 1640 via one or more of user devices 1680A-1680S, or third-party application developers accessing the system 1640 via one or more of user devices 1680A-1680S.

In some implementations, one or more of the service(s) 1642 may use one or more multi-tenant databases 1646, as well as system data storage 1650 for system data 1652 accessible to system 1640. In certain implementations, the system 1640 includes a set of one or more servers that are running on server electronic devices and that are configured to handle requests for any authorized user associated with any tenant (there is no server affinity for a user and/or tenant to a specific server). The user devices 1680A-1680S communicate with the server(s) of system 1640 to request and update tenant-level data and system-level data hosted by system 1640, and in response the system 1640 (e.g., one or more servers in system 1640) automatically may generate one or more Structured Query Language (SQL) statements (e.g., one or more SQL queries) that are designed to access the desired information from the multi-tenant database(s) 1646 and/or system data storage 1650.

In some implementations, the service(s) 1642 are implemented using virtual applications dynamically created at run time responsive to queries from the user devices 1680A-1680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1644 includes an application setup mechanism that supports application developers' creation and management of applications, which may be saved as metadata by save routines. Invocations to such applications, including the conversation mining service and/or the automation assistance service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1640 and the user devices 1680A-1680S.

Each user device 1680A-1680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1640. For example, the user interface device can be used to access data and applications hosted by system 1640, and to perform searches on stored data, and otherwise allow one or more of users 1684A-1684S to interact with various GUI pages that may be presented to the one or more of users 1684A-1684S. User devices 1680A-1680S might communicate with system 1640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1680A-1680S might include an HTTP client, commonly referred to as a "browser," for sending and receiving HTTP messages to and from server(s) of system 1640, thus allowing users 1684A-1684S of the user devices 1680A-1680S to access, process and view information, pages and applications available to it from system 1640 over network 1682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:
   identifying a set of out-of-domain conversations from among a plurality of unassigned conversations using a plurality of existing groups of semantically similar conversations, wherein the set of out-of-domain conversations comprises a first subset of the plurality of unassigned conversations;
   determining, based upon the plurality of unassigned conversations, a new candidate group of semantically similar conversations comprising a subset of the plurality of unassigned conversations, the subset of the plurality of unassigned conversations comprising a second subset of the set of out-of-domain conversations, wherein the new candidate group is distinct from the plurality of existing groups of semantically similar conversations, wherein a respective existing group of the plurality of existing groups comprises a distinct subset of conversations assigned to the respective existing group based on a respective representative utterance associated with the respective conversation of the distinct subset of conversations;
   determining a clustering performance metric associated with the new candidate group of semantically similar conversations based on a relationship between a reference semantic representation for the new candidate group of semantically similar conversations and respective semantic representations for the plurality of existing groups of semantically similar conversations; and
   when the clustering performance metric is greater than a threshold:
   automatically assigning one or more conversations of the plurality of unassigned conversations to the new candidate group based on a relationship between a respective representative utterance associated with a respective conversation of the one or more conversations and the reference semantic representation for the new candidate group; and
   automatically updating, at a database system, one or more records associated with the one or more conversations to include metadata identifying the new candidate group.

2. The method of claim 1, wherein identifying the new candidate group comprises clustering the second subset of the set of out-of-domain conversations into the new candidate group based on a respective representative utterance associated with the respective out-of-domain conversation of the second subset of the set of out-of-domain conversations.

3. The method of claim 1, wherein identifying the set of out-of-domain conversations comprises:
   assigning a respective unassigned conversation of the plurality of unassigned conversations to a first existing group of the plurality of existing groups based on a respective representative utterance associated with the respective unassigned conversation using a k-nearest neighbors (KNN) algorithm;
   determining a KNN consistency metric associated with the respective unassigned conversation based on the first existing group and one or more neighboring conversations assigned to respective ones of the plurality of existing groups; and
   adding the respective unassigned conversation to the set of out-of-domain conversations based at least in part on the KNN consistency metric.

4. The method of claim 1, wherein identifying the set of out-of-domain conversations comprises:
assigning a respective unassigned conversation of the plurality of unassigned conversations to an unclustered group of conversations using a Gaussian mixture model (GMM) fit to the plurality of existing groups; and
adding the respective unassigned conversation to the set of out-of-domain conversations in response to the GMM assigning the respective unassigned conversation to the unclustered group of conversations.

5. The method of claim 1, wherein determining the clustering performance metric comprises determining a silhouette score associated with a set of cluster groups comprising the new candidate group and the plurality of existing groups.

6. The method of claim 5, wherein automatically assigning the one or more conversations comprises configuring an assignment algorithm to cluster conversations into the set of cluster groups comprising the plurality of existing groups and the new candidate group when the silhouette score associated with the set of cluster groups is greater than zero.

7. The method of claim 1, further comprising configuring an assignment algorithm to cluster conversations into a set of cluster groups comprising the plurality of existing groups and the new candidate group when the clustering performance metric is greater than a cluster group inclusion threshold, resulting in an updated assignment algorithm, wherein automatically assigning the one or more conversations comprises automatically assigning the one or more conversations to the new candidate group based on the representative utterance associated with the respective conversation of the one or more conversations using the updated assignment algorithm.

8. The method of claim 7, wherein configuring the assignment algorithm comprises updating a fitted Gaussian mixture model (GMM) to include the new candidate group in addition to the plurality of existing groups.

9. The method of claim 1, further comprising determining a performance metric associated with the new candidate group after automatically assigning the one or more conversations, wherein the performance metric is influenced by one or more performance metrics associated with the one or more conversations.

10. At least one non-transitory machine-readable storage medium that provides instructions that, when executed by at least one processor, are configurable to cause the at least one processor to perform operations comprising:
identifying a set of out-of-domain conversations from among a plurality of unassigned conversations using a plurality of existing groups of semantically similar conversations, wherein the set of out-of-domain conversations comprises a first subset of the plurality of unassigned conversations;
determining, based upon the plurality of unassigned conversations, a new candidate group of semantically similar conversations comprising a subset of the plurality of unassigned conversations, the subset of the plurality of unassigned conversations comprising a second subset of the set of out-of-domain conversations, wherein the new candidate group is distinct from the plurality of existing groups of semantically similar conversations, wherein a respective existing group of the plurality of existing groups comprises a distinct subset of conversations assigned to the respective existing group based on a respective representative utterance associated with the respective conversation of the distinct subset of conversations;
determining a clustering performance metric associated with the new candidate group of semantically similar conversations based on a relationship between a reference semantic representation for the new candidate group of semantically similar conversations and respective semantic representations for the plurality of existing groups of semantically similar conversations; and
when the clustering performance metric is greater than a threshold:
automatically assigning one or more conversations of the plurality of unassigned conversations to the new candidate group based on a relationship between a respective representative utterance associated with a respective conversation of the one or more conversations and the reference semantic representation for the new candidate group; and
automatically updating one or more records associated with the one or more conversations to include metadata identifying the new candidate group.

11. The at least one non-transitory machine-readable storage medium of claim 10, wherein the instructions are configurable to cause the at least one processor to identify the new candidate group by clustering the second subset of the set of out-of-domain conversations into the new candidate group based on a respective representative utterance associated with a respective out-of-domain conversation of the second subset of the set of out-of-domain conversations.

12. The at least one non-transitory machine-readable storage medium of claim 10, wherein the instructions are configurable to cause the at least one processor to identify the set of out-of-domain conversations by:
assigning a respective unassigned conversation of the plurality of unassigned conversations to a first existing group of the plurality of existing groups based on a respective representative utterance associated with the respective unassigned conversation using a k-nearest neighbors (KNN) algorithm;
determining a KNN consistency metric associated with the respective unassigned conversation based on the first existing group and one or more neighboring conversations assigned to respective ones of the plurality of existing groups; and
adding the respective unassigned conversation to the set of out-of-domain conversations based at least in part on the KNN consistency metric.

13. The at least one non-transitory machine-readable storage medium of claim 10, wherein the instructions are configurable to cause the at least one processor to identify the set of out-of-domain conversations by:
assigning a respective unassigned conversation of the plurality of unassigned conversations to an unclustered group of conversations using a Gaussian mixture model (GMM) fit to the plurality of existing groups; and
adding the respective unassigned conversation to the set of out-of-domain conversations in response to the GMM assigning the respective unassigned conversation to the unclustered group of conversations.

14. The at least one non-transitory machine-readable storage medium of claim 10, wherein the clustering performance metric comprises a silhouette score.

15. The at least one non-transitory machine-readable storage medium of claim 10, wherein the clustering performance metric comprises a k-nearest neighbors (KNN) consistency metric.

16. The at least one non-transitory machine-readable storage medium of claim 10, wherein the instructions are configurable to cause the at least one processor to configure an assignment algorithm to cluster conversations into a set of cluster groups comprising the plurality of existing groups and the new candidate group when the clustering performance metric is greater than a cluster group inclusion threshold, resulting in an updated assignment algorithm, wherein automatically assigning the one or more conversations comprises automatically assigning the one or more conversations to the new candidate group based on the respective representative utterance associated with the respective conversation of the one or more conversations using the updated assignment algorithm.

17. A computing system comprising:
- at least one non-transitory machine-readable storage medium that stores software; and
- at least one processor, coupled to the at least one non-transitory machine-readable storage medium, to execute the software that implements a conversation mining service and that is configurable to perform operations comprising:
  - identifying a set of out-of-domain conversations from among a plurality of unassigned conversations using a plurality of existing groups of semantically similar conversations, wherein the set of out-of-domain conversations comprises a first subset of the plurality of unassigned conversations;
  - determining, based upon the plurality of unassigned conversations, a new candidate group of semantically similar conversations comprising a subset of the plurality of unassigned conversations, the subset of the plurality of unassigned conversations comprising a second subset of the set of out-of-domain conversations, wherein the new candidate group is distinct from the plurality of existing groups of semantically similar conversations, wherein a respective existing group of the plurality of existing groups comprises a distinct subset of conversations assigned to the respective existing group based on a respective representative utterance associated with the respective conversation of the distinct subset of conversations;
  - determining a clustering performance metric associated with the new candidate group of semantically similar conversations based on a relationship between a reference semantic representation for the new candidate group of semantically similar conversations and respective semantic representations for the plurality of existing groups of semantically similar conversations; and
  - when the clustering performance metric is greater than a threshold:
    - automatically assigning one or more conversations of the plurality of unassigned conversations to the new candidate group based on a relationship between a respective representative utterance associated with a respective conversation of the one or more conversations and the reference semantic representation for the new candidate group; and
    - automatically updating one or more records associated with the one or more conversations to include metadata identifying the new candidate group.

* * * * *